US006507769B2

(12) United States Patent
Urata et al.

(10) Patent No.: US 6,507,769 B2
(45) Date of Patent: *Jan. 14, 2003

(54) BILL ARRANGER

(75) Inventors: Ken Urata, Sanbu-gun (JP); Masaaki Egashira, Urawa (JP); Yoshiyuki Kato, Tokyo (JP)

(73) Assignee: Laurel Bank Machines Co., Ltd. (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/522,400

(22) Filed: Mar. 9, 2000

(65) Prior Publication Data

US 2002/0056958 A1 May 16, 2002

(30) Foreign Application Priority Data

Mar. 10, 1999 (JP) .......................................... 11-064111

(51) Int. Cl.[7] ................................................ G06F 7/00

(52) U.S. Cl. ....................... 700/223; 700/224; 700/227; 700/235; 700/228

(58) Field of Search ................................ 700/223, 228, 700/224, 227, 235; 209/3.3

(56) References Cited

U.S. PATENT DOCUMENTS

| | | | | | |
|---|---|---|---|---|---|
| 3,976,198 | A | * | 8/1976 | Carnes, Jr. et al. | 209/111.7 |
| 4,524,268 | A | * | 6/1985 | Fukatsu | 235/379 |
| 4,653,647 | A | | 3/1987 | Hashimoto | |
| 4,787,518 | A | * | 11/1988 | Yuge et al. | 209/534 |
| 4,827,395 | A | * | 5/1989 | Anders et al. | 364/138 |
| 4,856,768 | A | | 8/1989 | Hiroki et al. | |
| 4,905,840 | A | | 3/1990 | Yuge et al. | |
| 5,372,361 | A | * | 12/1994 | Isobe et al. | 271/181 |
| 5,469,241 | A | * | 11/1995 | Takahashi et al. | 355/64 |
| 5,790,697 | A | * | 8/1998 | Munro et al. | 382/135 |
| 5,815,592 | A | * | 9/1998 | Mennie et al. | 382/135 |
| 5,870,487 | A | * | 2/1999 | Graves et al. | 382/135 |
| 5,905,810 | A | * | 5/1999 | Jones et al. | 382/135 |
| 5,938,044 | A | * | 8/1999 | Weggesser | 209/534 |
| 6,012,564 | A | * | 1/2000 | Mukai | 194/206 |
| 6,186,307 | B1 | * | 2/2001 | Mukai | 194/206 |
| 6,220,419 | B1 | * | 4/2001 | Mennie | 194/207 |
| 6,241,069 | B1 | * | 6/2001 | Mazur et al. | 194/207 |
| 6,278,795 | B1 | * | 8/2001 | Anderson et al. | 382/135 |
| 6,311,819 | B1 | * | 11/2001 | Stromme et al. | 194/207 |

FOREIGN PATENT DOCUMENTS

| | | |
|---|---|---|
| JP | 7021437 | 1/1995 |
| KR | 1994-0005823 | 6/1994 |

* cited by examiner

*Primary Examiner*—Kathy Matecki
*Assistant Examiner*—Michael E Butler
(74) *Attorney, Agent, or Firm*—Nixon & Vanderhye PC

(57) ABSTRACT

The bill arranger of the present invention comprises: a loader for loading bills and feeding the bills one by one; a conveyer for conveying the bills fed from said loader; a discriminating device for discriminating the bills conveyed by said conveyer; a plurality of stackers for stacking the bills, which are conveyed by said conveyer, so that the bills can be removed; an operating device for selecting one of sorting process modes which defines a method of sorting the bills loaded in said loader; a controller for delivering the bills, which are fed from said loader, to one of said stackers, by said conveyer, based on the results of the discrimination by said discriminating device, according to the sorting process mode selected by said operating device; and displays, separately provided for said respective stackers, which can change displayed contents.

8 Claims, 17 Drawing Sheets

FIG.11

| KEY | FUNCTION | | |
|---|---|---|---|
| | SORTING SETTING | FUNCTION SETTING | OTHER |
| START/STOP | | | START/STOP SORTING |
| BATCH | ○ | ○ | DISPLAY REMAINING NUMBER IN STACKER |
| OBVERSE/REVERSE | ○ | ○ | |
| NORMAL/DAMAGED | ○ | ○ | DISPLAY DETAILS OF DAMAGED BILLS |
| UV | ○ | ○ | DISPLAY DETAILS OF REJECTS |
| 100 | ○ | | |
| 50 | ○ | | |
| 10 | ○ | | |
| OL | | | SELECT ON-LINE |
| PRINT | | | PRINT |
| FUNCTION | | ○ | |
| NUMBER/SUM | | | SWITCH DISPLAY OF NUMBER/SUM |
| TOTAL | | | SWITCH DISPLAY OF SUBTOTAL/TOTAL |
| SET | ○ | ○ | INITIALIZE SETTING |
| MODE | | | SET MODE |
| TEN KEYS | | ○ | INPUT OPERATOR NUMBER |
| CE | | ○ | DELETE OPERATOR NUMBER |
| ENT | | ○ | FIX |

FIG.13

| | SORTING SETTING | | FIRST STACKER | | SECOND STACKER | | THIRD STACKER | | REJECTER |
|---|---|---|---|---|---|---|---|---|---|
| 1 | DENOMINATION SORTING | | 100 | ○ | 50 | ○ | 10 | ○ | FALSE |
| 2 | DENOMINATION SORTING | | 100 OBVERSE | ○ | 50 OBVERSE | ○ | 10 OBVERSE | ○ | FALSE · 100, 50, 10 REVERSE |
| 3 | DENOMINATION SORTING | | 100 NORMAL | ○ | 50 NORMAL | ○ | 10 NORMAL | ○ | FALSE · 100, 50, 10 DAMAGE |
| 4 | DENOMINATION SORTING | | 100 OBVERSE · NORMAL | ○ | 50 OBVERSE · NORMAL | ○ | 10 OBVERSE · NORMAL | ○ | FALSE · 100, 50, 10 DAMAGE／REVERSE · NORMAL |
| 5 | DESIGNATED DENOMINATION SORTING | 100 | NO DESIGNATION | ○ | NO DESIGNATION | ○ | NO DESIGNATION | ○ | FALSE, OR UNDESIGNATED DENOMINATION |
| 6 | DESIGNATED DENOMINATION SORTING | 100 | OBVERSE | ○ | OBVERSE | ○ | REVERSE | ○ | FALSE, OR UNDESIGNATED DENOMINATION |
| 7 | DESIGNATED DENOMINATION SORTING | 100 | NORMAL | ○ | NORMAL | ○ | DAMAGED | | FALSE, OR UNDESIGNATED DENOMINATION |
| 8 | DESIGNATED DENOMINATION SORTING | 100 | OBVERSE · NORMAL | ○ | REVERSE · NORMAL | ○ | DAMAGED | | FALSE, OR UNDESIGNATED DENOMINATION |
| 9 | DESIGNATED DENOMINATION SORTING | 100 | OBVERSE · TOP | ○ | OBVERSE · BOTTOM | ○ | REVERSE | | FALSE, OR UNDESIGNATED DENOMINATION |
| 10 | DESIGNATED DENOMINATION SORTING | 100 | NORMAL | ○ | DAMAGED | | FALSE | | UNDESIGNATED DENOMINATION |
| 11～16 | DESIGNATED DENOMINATION SORTING | 50 | SAME AS CASE OF "100" | | | | | | |
| 17～22 | DESIGNATED DENOMINATION SORTING | 10 | SAME AS CASE OF "100" | | | | | | |
| 23 | MIX | | MIX | | MIX | | MIX | | FALSE |

100: TEN THOUSAND, 50: FIVE THOUSAND, 10: THOUSAND, ○: BATCH ENABLE

FIG.17

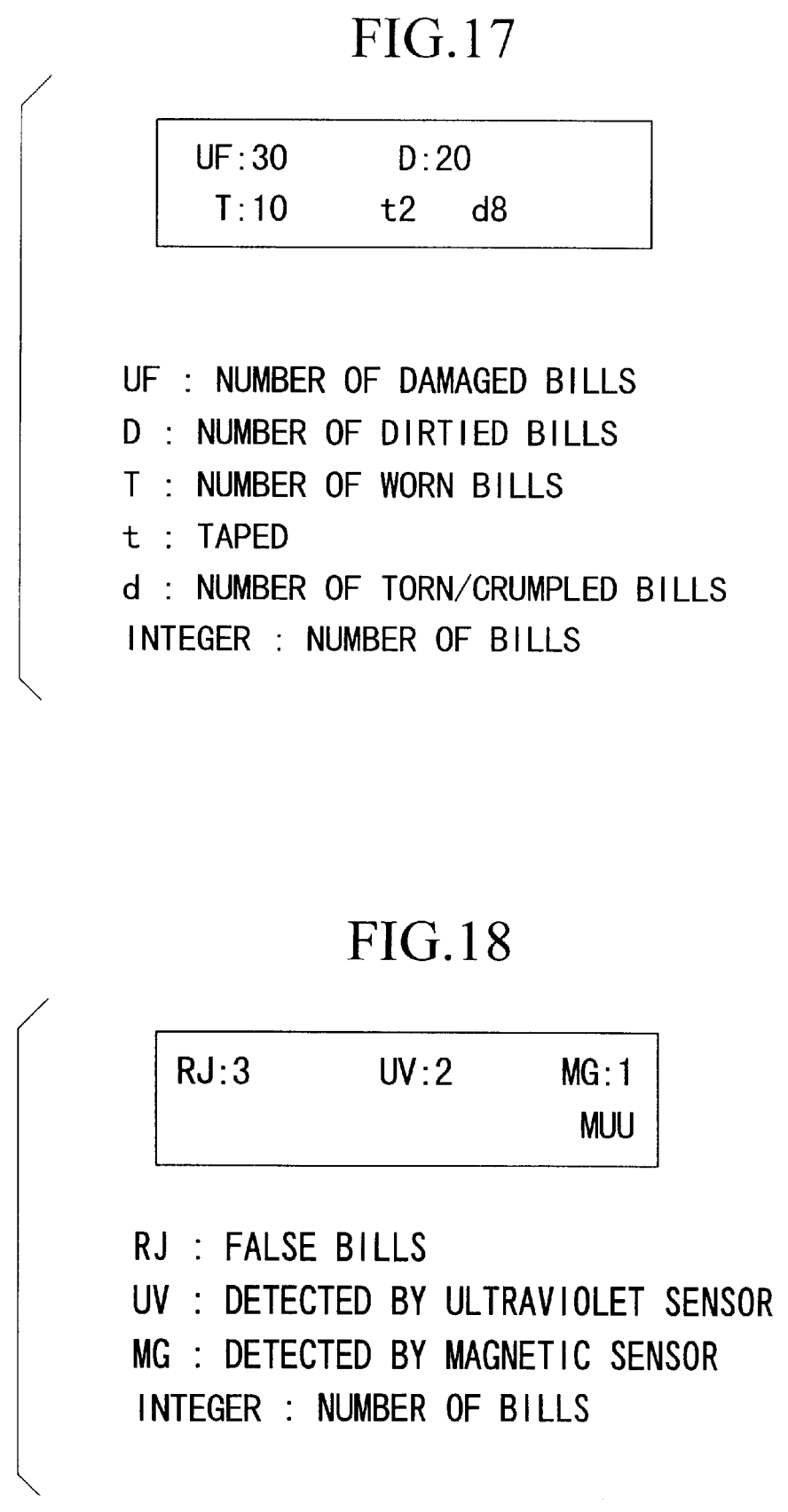

| | | |
|---|---|---|
| UF:30 | D:20 | |
| T:10 | t2 | d8 |

UF : NUMBER OF DAMAGED BILLS
D : NUMBER OF DIRTIED BILLS
T : NUMBER OF WORN BILLS
t : TAPED
d : NUMBER OF TORN/CRUMPLED BILLS
INTEGER : NUMBER OF BILLS

FIG.18

| | | |
|---|---|---|
| RJ:3 | UV:2 | MG:1 |
| | | MUU |

RJ : FALSE BILLS
UV : DETECTED BY ULTRAVIOLET SENSOR
MG : DETECTED BY MAGNETIC SENSOR
INTEGER : NUMBER OF BILLS

BILL ARRANGER

BACKGROUND OF THE INVENTION

1. Field of the Invention

The present invention relates to a bill arranger for discriminating bills and sorting them based on the discrimination.

This application is based on Japanese Patent Application No. 11-64111, the contents of which are incorporated herein by reference.

2. Description of the Related Art

A conventional bill arranger for discriminating bills and sorting them based on the results of the discrimination is disclosed in Japanese Unexamined Patent Application, First Publication No. Hei 7-21437.

The bill arranger comprises a loader, a conveyer, a discriminating device, a plurality of stackers, and a wrapping device.

The loader loads a number of stacked bills, and sends the bills one by one into the bill arranger.

The discriminating device discriminates the bills sent from the loader into the bill arranger depending on the denominations of the bills.

The conveyer conveys the bills, which the loader sent into the bill arranger, to one of the stackers and the wrapping device, based on the results of the discrimination by the discriminating device.

The stackers stack the bills conveyed from the loader by the conveyer. The stackers are exposed to the outside to allow an operator to remove the bills stacked therein.

The wrapping device stacks a predetermined amount of bills transferred from the loader through the conveyer, and wraps a tape around the stacked bills.

Conventional bill arrangers can not only sort the bills loaded in the loader according to denominations but also perform various types of sorting processes, e.g., sorting bills of the same denomination into obverse bills and reverse bills. The stackers do not always stack bills of the same denomination. Therefore, an operator must keep in mind how the bills are sorted into the stackers. However, since the sorting processes are various, the operator may lose track of how the bills are sorted into the stackers.

BRIEF SUMMARY OF THE INVENTION

It is therefore an object of the present invention to provide a bill arranger which allows an operator to easily confirm how bills are sorted into stackers.

To achieve the purpose, the bill arranger of the present invention comprises: a loader for loading bills and feeding the bills one by one; a conveyer for conveying the bills fed from the loader; a discriminating device for discriminating the bills conveyed by the conveyer; a plurality of stackers for stacking the bills, which are conveyed by the conveyer, so that the bills can be removed; an operating device for selecting one of sorting process modes which defines a method of sorting the bills loaded in the loader; a controller for delivering the bills, which are fed from the loader, to one of the stackers, by the conveyer, based on the results of the discrimination by the discriminating device, according to the sorting process mode selected by the operating device; and displays, separately provided for the respective stackers, which can change displayed contents.

When the bills loaded in the loader are fed, the conveyer conveys the bills. While conveying the bills, the bills are discriminated by the discriminating device. Based on the results of the discrimination by the discriminating device, the controller delivers the bills to one of the stackers according to the selected sorting process.

Thus, the bills are stacked in the stackers. The respective stackers have the separate displays. The respective separate displays display how the bills are sorted into the stackers. Even when various sorting processes are selectable, the operator can easily confirm the details of the sorting of the bills stacked in the stackers.

One of a plurality of sorting process modes is selected with the operating device, the controller indicates the respective details of sorting of the stackers according to the selected sorting process mode on the corresponding displays.

The respective separate displays display how the bills are sorted into the stackers. Even when various sorting processes are performed, the operator can easily confirm the details of the sorting of the bills stacked in the stackers according to the selected sorting process mode.

The displays indicate at least one of the number and sum of the bills stacked in the stackers.

Because each display displays at least one of the number and the sum of the bills stacked in the stacker, the operator can easily recognize the respective amounts of the bills stacked in the stackers.

The bill arranger further comprises a general display in common for all the stackers, which can change displayed contents.

The general display displays the total number or the total sum of the bills in all the stackers which is the information common to all the stackers. Thus, the operator can recognize the information common to all the stackers.

The general display indicates at least one of the total number and the total sum of all the bills stacked in the stackers. Thus, the operator can recognize the information common to all the stackers.

The general display indicates one of the total number and the total sum of all the bills stacked in the stackers, and indicates whether the total number or the total sum is selected.

The general display indicates one of the total number and the total sum of all the bills stacked in said stackers, and indicates whether the total number or the total sum is selected. The operator can recognize whether the number or the sum of the bills is displayed.

BRIEF SUMMARY OF THE INVENTION

It is therefore an object of the present invention to provide a bill arranger which can prevent bills, which are stacked by stackers, from being inadvertently extracted by an operator.

To achieve the purpose, the bill arranger of the present invention comprises: a loader for loading bills and feeding the bills one by one; a conveyer for conveying the bills fed from the loader; a discriminating device for discriminating the bills conveyed by the conveyer; a plurality of stackers for stacking the bills, which are conveyed by the conveyer, so that the bills can be removed; an operating device for selecting one of the sorting process modes which defines a method of sorting the bills loaded in the loader; and a controller for delivering the bills, which are fed from the loader, to one of the stackers, by the conveyer, based on the results of the discrimination by the discriminating device, according to the sorting process mode selected by the operating device.

The respective stackers have shutters controlled by the controller, the shutters allowing the removal of the stacked bills when the shutters are opened, and preventing the removal of the stacked bills when the shutters are closed.

When the bills loaded in the loader are fed, the conveyer conveys the bills. While conveying the bills, the bills are discriminated by the discriminating device. Based on the results of the discrimination by the discriminating device, the controller delivers the bills to one of the stackers according to the selected sorting process.

Thus, the bills are stacked in the stackers. The respective stackers have the shutters controlled by the controller. When the shutters are opened, the stacked bills can be removed. When the shutters are closed, the bills cannot be removed. Thus, the bills stacked in the stackers are prevented from being inadvertently removed by the operator.

There are two conditions one in which the removal of the bills from the stackers is allowed, and another in which the removal of the bills from the stackers is not allowed. Only when the removal of the bills from the stackers is allowed, are the shutters opened.

Thus, the bills stacked in the stackers are reliably prevented from being inadvertently removed by the operator.

The closed shutters are fixed so that the shutters cannot be opened.

The closed shutters cannot be manually opened. Thus, the bills stacked in the stackers are more reliably prevented from being inadvertently removed by the operator.

Further, the respective stackers have position changers for changing the positions of the stacked bills, the controller controlling the position changers to change the positions of the stacked bills when the shutters are opened.

Thus, the stacked bills, which were hard to remove, become easy to remove. This improves the working efficiency when the operator removes the bills from the stackers.

As the shutters are opened, the position changer changes the positions of the bills.

The same driving source is used to drive the shutters and to drive the position changer for changing the positions of the bills. Thus, the costs are reduced.

BRIEF DESCRIPTION OF THE DRAWINGS

FIG. 11 is a list showing the functions of keys of an embodiment of the present invention.

FIG. 13 is a list showing sorting settings of an embodiment of the bill arranger of the present invention.

FIG. 16A shows the display of the number of stacked bills, FIG. 16B shows the display of the sum of bills, FIG. 16C shows the display of the number of stacked bills, and FIG. 16D shows the display of the deficiencies in the batch number.

FIG. 17 is a diagram showing the display of the details of the damaged bills on the function display of an embodiment of the bill arranger of the present invention.

FIG. 18 is a diagram showing the display of the details of the false bills on the function display of an embodiment of the bill arranger of the present invention.

DETAILED DESCRIPTION OF THE INVENTION

Figure 1:
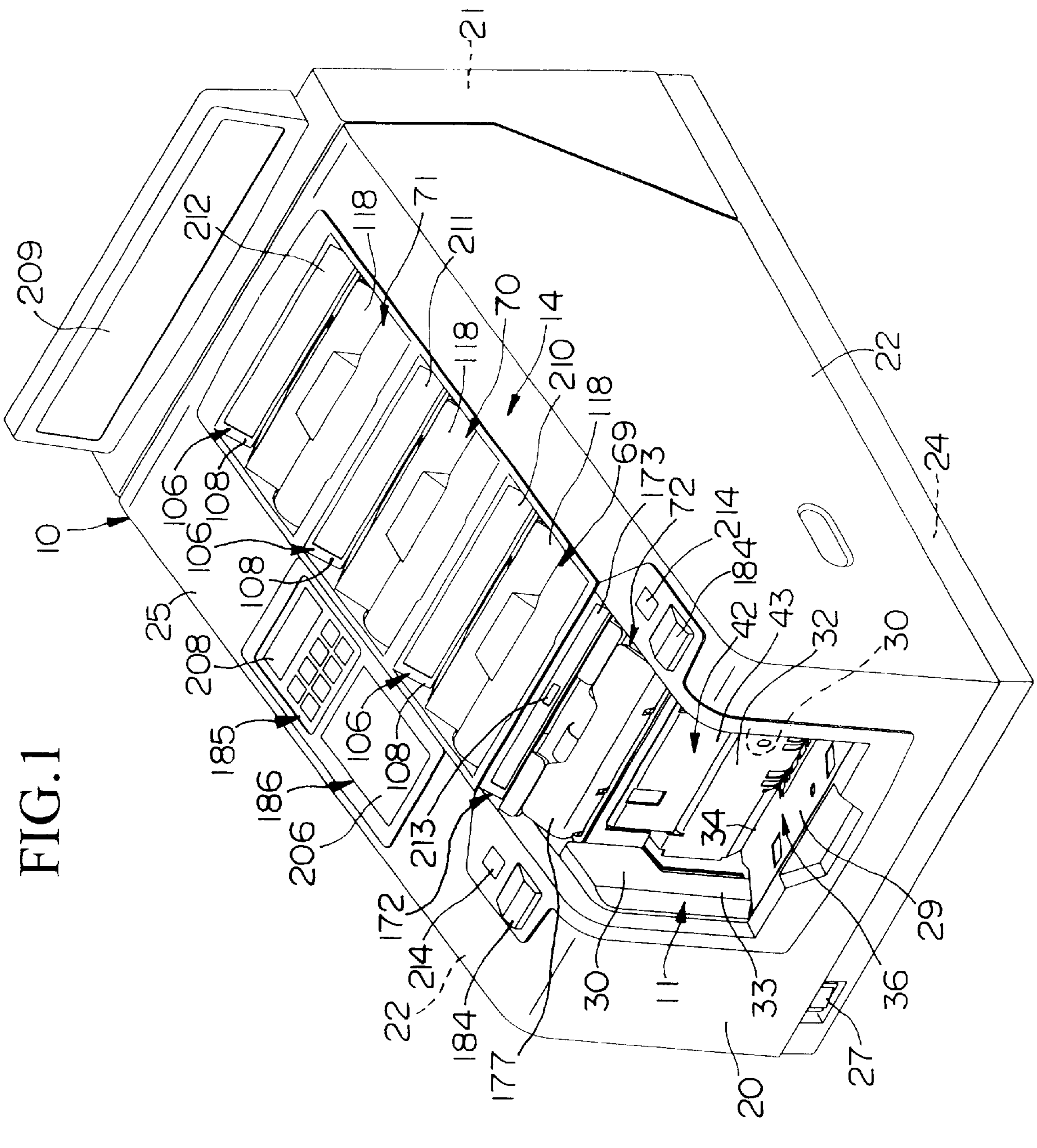
FIG. 1 is a perspective view showing an embodiment of the bill arranger of the present invention.

An embodiment of the bill arranger according to the present invention will be explained with reference to FIGS. 1 to 18.

The bill arranger for sorting bills while counting the number thereof comprises a loader 11, a conveyer 12, a discriminating device 13, a releasing device 14, an operating device 15, a display 16, and a controller 17.

Machine Body

The machine body 10 of the bill arranger has a front face 20, a rear face 21, a pair of right and left side faces 22, a bottom face 24, and a top face 25.

The front face 20 extends in the vertical direction.

One of the side faces 22 extends from the left edge of the front face 20 in the rear direction. The other side face 22 extends from the right edge of the front face 20 in the rear direction. Further, both the side faces 22 stand vertically, parallel to each other.

The rear face 21 connects both rear ends of the side faces 22 and is roughly in parallel to the front face 20.

The bottom face 24 is connected to the bottom edges of the front face 20, the side faces 22, and the rear face 21. This bottom face 24 extends horizontally.

The top face 25 is connected to the upper edges of the front face 20, the side faces 22, and the rear face 21. The top face 25 is inclined so that the rear portion of the top face 25 is higher than the front portion of the top face 25.

On the lower side of the front face 20, a main switch 27 is provided. This main switch 27 can be operated by an operator to turn on or off the main power supply to the bill arranger.

Loader

The loader 11, provided at the front of the machine body 10, loads a number of stacked bills S. The bills S loaded in the loader 11 are vertically stacked. The loader 11 separates and sends one by one the lowest bill of the stacked bills S into the machine body 10.

The loader 11 has a loader bottom face 29, a pair of loader side faces 30, and a loader rear face 32.

The loader bottom face 29 extends from the front face 20 in the rear direction, and is inclined so that its rear portion is lower than its front portion.

One of the loader side face 30 is connected to the left side of the loader bottom face 29, while the other loader side face 30 is connected to the right side of the loader bottom face 29. The loader side faces 30 are disposed in parallel to the side faces 22 of the machine body 10.

The loader rear face 32 is disposed between the loader side faces 30, and is in parallel to the front face 20 of the machine body 10.

These loader bottom face 29, the loader side faces 30, and the loader rear face 32 form a loading space 33 in the front face 20 of the machine body 10, which is slightly dented toward the rear. The loading space 33 is opened in the upper face 25 of the machine body 33.

In the loading space 33, the stacked bills S are loaded so that the longitudinal sides of the bills are aligned in the side-to-side direction. The short sides of the stacked bills S are guided by the loader side faces 30. The rear side of the stacked bills S is guided by the loader rear face 32. In this situation, the bills S are stacked in parallel to the loader bottom face 29. That is, the stacked bills are slightly inclined so that their rear portions are lower than the front portions. At the boundary between the loader bottom face 29 and the loader rear face 32, a feeding opening 34 is provided. This feeding opening 34 is for feeding the stacked bills S into the machine body 10.

The loader 11 has a bill feeder 36 at its lower portion. The bill feeder 36 comprises an injecting roller 37, a feeding roller 38, a separating roller 39, and a conveyer drive motor 40 for driving these rollers.

The injecting roller 37 is disposed at the middle point between the front and the rear of the loader bottom face 29. A part of the injecting roller 37 protrudes upward through the loader bottom face 29. The injecting roller 37 is rotated and driven by the conveyer drive motor 40. The injecting roller 37 is in contact with the lowest bill of the stacked bills S loaded in the loading space 33, and injects this bill into the feeding opening 34.

The feeding roller 38 is provided below the feeding opening 34. The separating roller 39 is provided above the feeding roller 38. The feeding roller 38 is rotated by the conveyer drive motor 40. The feeding roller 38 comes in contact with the bill injected by the injecting roller 37, and feeds it into the machine body 10.

The separating roller 39 comes in contact with the top of a bill which is being moved together with the bill injected by the injecting roller 37. Then, the upper bill is prevented from being fed into the feeding opening 34. That is, the separating roller 39 makes bills, other than the bill injected by the injecting roller 37, remain in the loading space 33.

Thus, the bill feeder 36 separates and feeds the stacked bills S, loaded in the loading space 33, one by one into the machine body 10.

The loader 11 has a bill pressing member 42 at its upper side.

The bill pressing member 42 has a pressing face 43. The bill pressing member 42, when it stands, is inserted so as to be flush with the loader rear face 32 of the machine body 10.

The bill pressing member 42 is rotatable about its lower shaft so that it can fall down toward the front. When the bill pressing member 42 falls down, the pressing face 43 also falls downward to just above the loading bottom face 29.

Thus, the bill pressing member 42 falls down on the stacked bills and presses them downwardly when there is a small number of stacked bills S in the loading space 33. The pressing force of the bill pressing member 42 onto the stacked bills S is produced by its own weight.

The bill pressing member 42 presses the top of the stacked bills S, to thereby increase the friction between the lowest bill of the stacked bills S and the injecting roller 37. As the result, even when there is a small number of the stacked bills S in the loading space 33, the lowest bill can be securely injected by the injecting roller 37.

On the other hand, when the bill pressing member 42 rises, the pressing face 43 is aligned with the loader rear face 32. Thus, the bill pressing member 42 can be retracted from the loading space 33. When a comparatively large number of stacked bills is loaded in the loading space 33, the bill pressing member 42 is retracted from the loading space 33. In this situation, the bill pressing member 42 does not interfere with the stacked bills S loaded on the loader 1. The bill pressing member 42 rises when in the loading space 33 there are a number of stacked bills S which sufficiently increases the friction between the lowest bill and the injecting roller 37.

The bill pressing member 42 can be manually raised or pulled down by an operator.

In the loader 11, a bill detecting sensor 44 is provided. The bill detecting sensor 44 can detect the presence or absence of a bill in the loader 11. The bill detecting sensor 44 outputs the result of the detection to the controller 17.

Conveyer

The conveyer 12 can convey the bill fed from the loader 11. The conveyer 12 conveys the bill so that their longitudinal sides are aligned in the side-to-side direction. The conveyer 12 is controlled by the controller 17.

The conveyer 12 has a first conveyer path 45, a second conveyer path 46, a third conveyer path 47, a fourth conveyer path 48, a fifth conveyer path 49, a sixth conveyer path 50, a seventh conveyer path 51, and an eighth conveyer path 52. These conveyer paths 45 to 52 includes a plurality of rollers, a plurality of conveying belts, and a plurality of guides which are not shown. The conveyer paths 45 to 52 are driven by the conveyer drive motor 40 as well as the bill feeder 36 of the loader 11.

The first conveyer path 45 is provided in the lower space in the machine body 10 and conveys the bill, which is fed from the loader 11, from the front to the rear.

The second conveyer path 46 is connected to the end of the first conveyer path 45. The second conveyer path 46 receives the bill conveyed by the first conveyer path 45, and conveys the bill from the lower rear space to the upper rear space within the machine body 10.

The third conveyer path 47 is connected to a first branch point 54 at the end of the second conveyer path 46. The third conveyer path 47 receives the bill conveyed by the second conveyer path 46, further conveys it toward the rear of the machine body 10, and then sends it toward the top.

The fourth conveyer path 48 is connected to the first branch point 54. The fourth conveyer path 48 receives the bill conveyed by second conveyer path 46, and conveys it toward the front.

The fifth conveyer path 49 is connected to a second branch point 55 at the end of the fourth conveyer path 48. The fifth conveyer path 49 receives the bill conveyed by the fourth conveyer path 48, and conveys it toward the top. The second branch point 55 is nearer to the front than the first branch point 54.

The sixth conveyer path 50 is connected to the second branch point 55. The sixth conveyer path 50 receives the bill conveyed by the fourth conveyer path 48, and conveys it toward the front.

The seventh conveyer path 51 is connected to a third branch point 56 at the end of the sixth conveyer path 50. The seventh conveyer path 51 receives the bill conveyed by the sixth conveyer path 50, and conveys it toward the top. The third branch point 56 is nearer to the front than the second branch point 55.

The eighth conveyer path 52 is connected to the third branch point 56. The eighth conveyer path 52 receives the bill conveyed by the six conveyer path 50, and conveys it to the front.

The conveyer 12 has a first sorter 58, a second sorter 59, a third sorter 60, a first solenoid 61, a second solenoid 62, and a third solenoid 63.

The first sorter 58 is provided at the first branch point 54. The first sorter 58 is driven by the first solenoid 61 to selectively connect the second conveyer path 46 to one of the third conveyer path 47 and the fourth conveyer path 48. That is, the first sorter 58 switches the route of the bill, which is conveyed by the second conveyer path 46 to one of the third conveyer path 47 and the fourth conveyer path 48.

The second sorter 59 is provided at the second branch point 55. The second sorter 59 is driven by the second solenoid 62 to selectively connect the fourth conveyer path 48 to one of the fifth conveyer path 49 and the sixth conveyer path 50. That is, the second sorter 59 switches the route of the bill, which is conveyed by the fourth conveyer path 48 to one of the fifth conveyer path 49 and the sixth conveyer path 50.

The third sorter 60 is provided at the third branch point 56. The third sorter 60 is driven by the third solenoid 63 to selectively connect the sixth conveyer path 50 to one of the seventh conveyer path 51 and the eighth conveyer path 52. That is, the third sorter 60 switches the route of the bill, which is conveyed by the sixth conveyer path 50 to one of the seventh conveyer path 51 and the eighth conveyer path 52.

In the conveyer paths 45 to 52, a plurality of bill detecting sensors 64 are provided. These bill detecting sensors 64 detect the bills in the conveyer paths 45 to 52. The bill detecting sensors 64 are used to judge whether the condition of the bills in the conveyer paths 45 to 52 is normal or abnormal. Further, the bill detecting sensors 64 are used to control the timings of driving the sorters 58 to 60 by the solenoids 61 to 63.

Discriminating Device

The discriminating device 13 discriminates the bill conveyed through the first conveyer path 45 of the conveyer 12, and outputs the result of the discrimination to the controller 17. The discriminating device 13 has a first discriminating unit 66 and a second discriminating unit 67.

The first discriminating unit 66 detects the image data of the bill conveyed by the conveyer 12, and the magnetic data from the materials contained in the ink on the bill, and outputs the results of the discrimination to the controller 17. The controller 17 compares the detected image data with the standard image, and compares the detected magnetic data with the standard magnetic data. Based on the comparisons, the genuineness, denomination, obverse or reverse, top or bottom, and normal or damaged condition of the bill can be judged.

The second discriminating unit 67 emits ultraviolet light on the bill conveyed by the conveyer 12, and detects the presence or absence of light reflected from the bill (visible light). The second discriminating unit 67 outputs the results of the detection to the controller 17. The ink on the true bill contains a material which can convert ultraviolet light into visible light. Therefore, the controller 17 can judge the presence or absence of the material based on the presence or absence of the visible light reflected from the bill, to thereby determine the genuineness of the bill.

From the results of the discrimination by the first and second discriminating devices 66 and 67, the controller 17 judges the genuineness, denomination, obverse or reverse, top or bottom, and normal or damaged condition of the bill.

Here, the discrimination of the genuineness of the bill means judging whether the bill is genuine or counterfeit.

The discrimination of the denomination means judging the denomination of the bill.

The discrimination of the obverse or reverse of the bill means judging whether the bill is an "obverse note" or a "reverse note." An obverse note means a bill whose upper face is the obverse when the bill passes through the first discriminating unit 66. A reverse note means a bill whose upper face is the reverse when the bill passes through the first discriminating unit 66.

The discrimination of the top or bottom of the bill means judging whether the bill is an "upward note" or an "inverted note". An upward note is a bill whose downstream side with respect to the conveyance direction is the top when the bill passes through the first discriminating unit 66. A inverted note is a bill whose downstream side with respect to the conveyance direction is the bottom when the bill passes through the first discriminating unit 66.

The discrimination of the normal or damaged condition of the bill means judging whether the bill is a "normal note" or a "damaged note". Here, the normal note is a bill which is clean and reusable. The damaged note is a bill which is unclean or damaged and is not reusable.

The controller 17 judges that the bill is a false note, even if the first discriminating unit 66 judges that the bill is a true note, and when the second discriminating unit 67 does not detect the normal reflected light.

Releasing Device

The releasing device 14 is controlled by the controller 17, and has a plurality of stackers, which are a first stacker (stacking means) 69, a second stacker (stacking means) 70, and a third stacker (stacking means) 71, and a rejecter 72. The first stacker 69, the second stacker 70, and the third stacker 71, and the rejecter 72 stack the bills and allow the operator to remove the bills which have been conveyed by the conveyer 12.

The first stacker 69 is provided near the front side of and in the upper side of the machine body 10, and is connected to the downstream end of the seventh conveyer path 51.

The second stacker 70 is provided behind the first stacker 69 located in the upper side of the machine body 10, and is connected to the downstream end of the fifth conveyer path 49.

The third stacker 71 is provided behind the second stacker 70 located in the upper side of the machine body 10, and is connected to the downstream end of the third conveyer path 47.

The rejecter 72 is disposed in front of the first stacker 69 in the upper side of the machine body 10, and behind the loading space 33. The rejecter 72 is connected to the downstream end of the eighth conveyer path 52.

Although, as described above, the first stacker 69, the second stacker 70, and the third stacker 71 are located at the different positions and are connected to different conveyer paths, these stackers 69 to 71 have the same structure.

Next, the stackers will now be explained in detail by way of the first stacker 69 as an example with reference to FIGS. 3 to 9.

Figure 4:
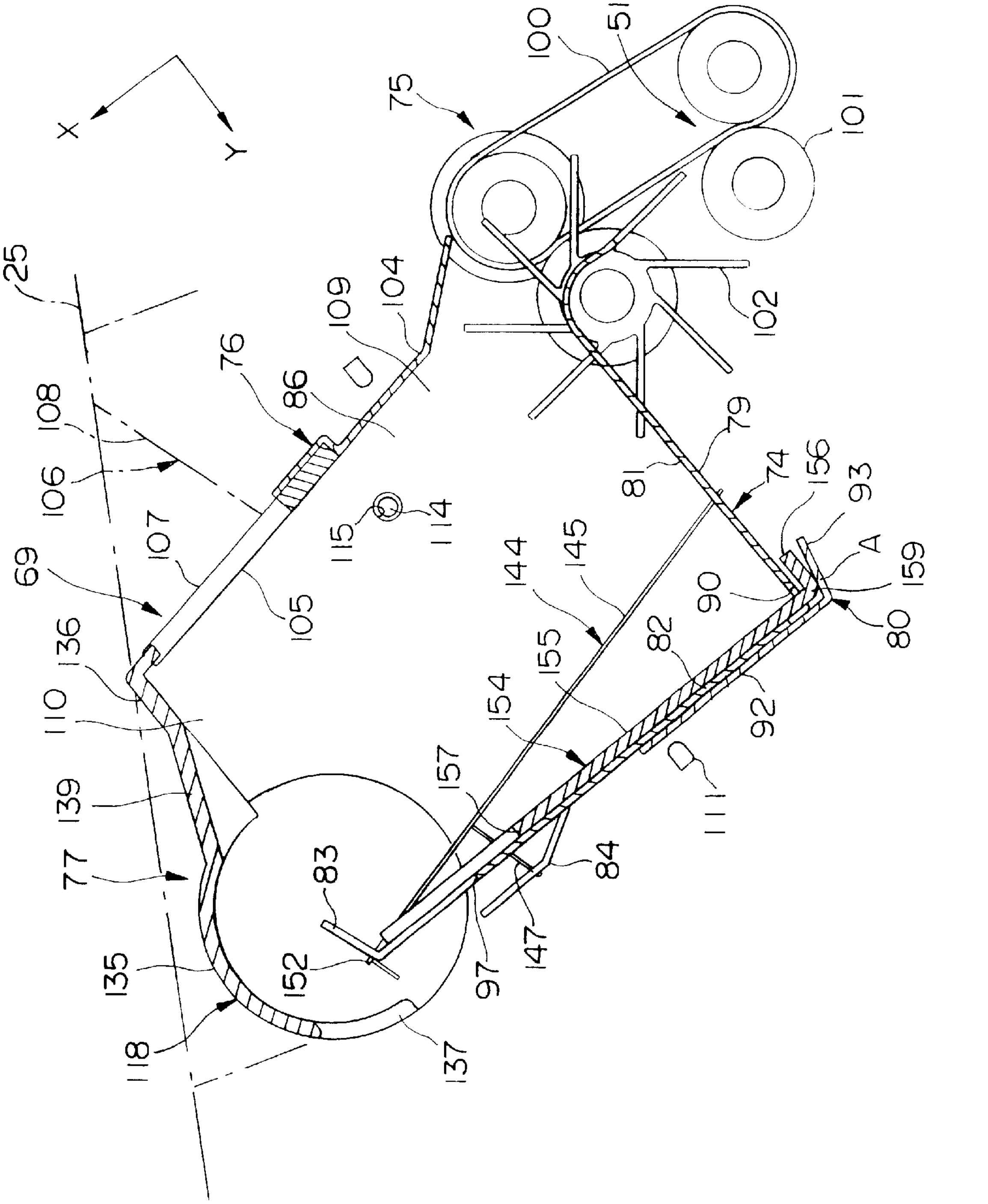
FIG. 4 is a cross-sectional side view showing a stacker, whose shutter is closed, in an embodiment of the bill arranger of the present invention.

As shown in FIG. 4, the first stacker 69 has a bottom forming member 74, a releasing mechanism 75, an upper cover 76, and a shutter mechanism (position changer) 77.

The bottom forming member 74 has a principal member 79 and a supporting member 80.

Figure 6:
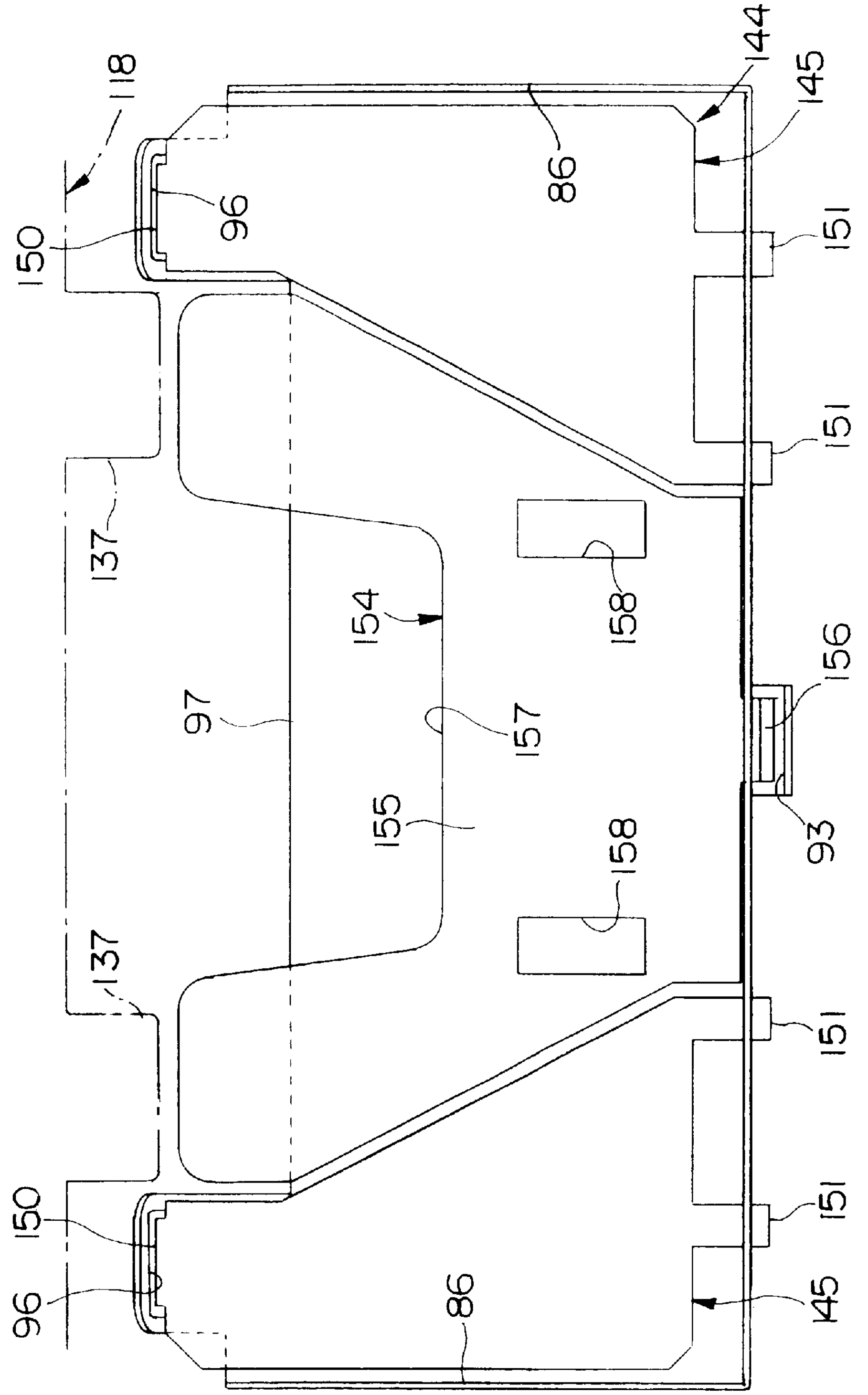
FIG. 6 is a cross-sectional front view showing the stacker in an embodiment of the bill arranger of the present invention.

The principal member 79 has a rear plate 81, a front plate 82, an upper plate 83, a pair of right and left supporting plates 84 (only one of the pair is shown), and a pair of right and left side plates 86 shown in FIG. 6.

The rear plate 81 is inclined so that its rear portion is positioned above its front portion. In the front portion of the rear plate 81, a plurality of guide grooves 89 extends in the front-rear direction. Further, in the front portion of the rear plate 81, a lower engaging long hole 90 extends in the side-to-side direction.

Figure 7:
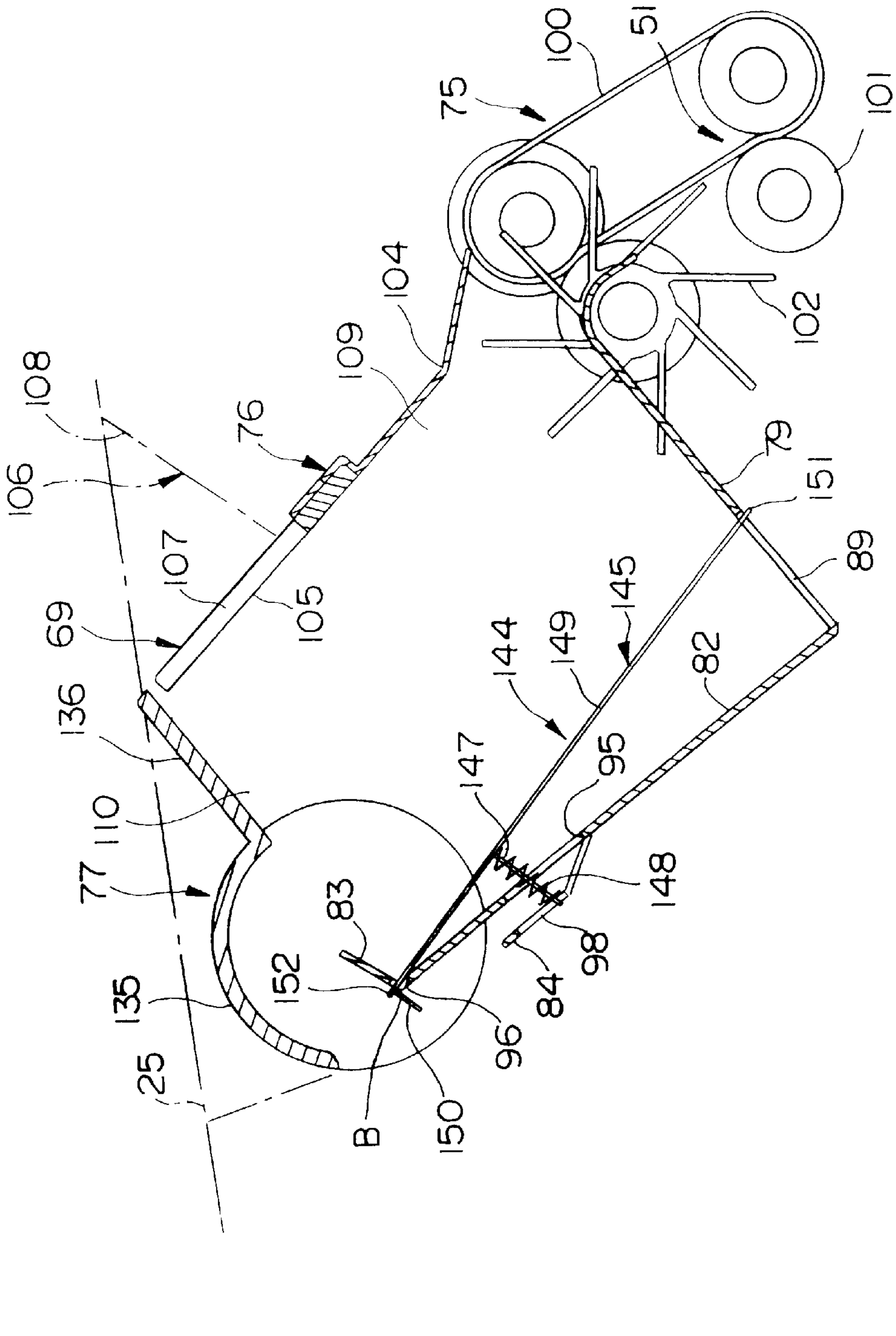
FIG. 7 is a cross-sectional side view showing the stacker in an embodiment of the bill arranger of the present invention, and particularly, the details of an example of a guide mechanism of the present invention.

The front plate 82 of the principal member 79 extends from the front end of the rear plate 81 toward the upper front. In the right and left portions of the front plate 82, the long holes 95 extend in the front-rear direction as shown in FIG. 7. In the right and left portions at the upper end of the front plate 82, upper engaging long openings 96 extend in the side-to-side direction. In the upper portion of the front plate 82, an insertion groove 97 shown in FIGS. 4 and 7 is made in the middle thereof in the side-to-side direction.

The supporting member 80 has an attached plate 92, and an engaging plate 93.

The supporting member 80 is attached via the upper portion of the attached plate 92 to the front portion of the front plate 82 of the principal member 79. In this situation, the lower portion of the attached plate 92 protrudes below the rear plate 81 of the principal member 79. The engaging plate 93 is disposed below the lower engaging long hole 90 of the rear plate 81.

The upper plate 83 of the principal member 79 extends from the upper end of the front plate 82 toward the upper rear.

The supporting plate 84 is disposed below the long holes 95 of the front plate 82. The supporting plate 84 has a long hole 98 extending in the front-rear direction as shown in FIG. 7.

One of the side plates 86 shown in FIG. 6 is positioned between the front plate 82 and the rear plate 81. The other side plate 86 is located in the opposite side between the front plate 82 and the rear plate 81. Both the side plates 86 are parallel to the side faces 22 of the machine body 10.

The releasing mechanism 75 shown in FIG. 4 has a releasing belt 100, a feeding roller 101, and an impeller 102. The releasing mechanism 75 is driven by the conveyer drive motor 40 as well as the loader 11 and the conveyer 12.

The releasing belt 100 is inclined so that its front portion is above its rear portion.

The feeding roller 101 is located below the rear portion of the releasing belt 100.

The impeller 102 is located below the front portion of the releasing belt 100.

Thus, the releasing mechanism 75 receives the bill, which has been conveyed through the seventh conveyer path 51, with the releasing belt 100 and the feeding roller 101. Then, the received bill is fed by the releasing belt 100 and the feeding roller 101 to the impeller 102. The bill is thus delivered onto the bottom forming member 74 through the gap between the releasing belt 100 and the impeller 102.

Then, the releasing mechanism 75 delivers the bill approximately in parallel to the front plate 82 of the bottom forming member 74. The bills released from the releasing mechanism 75 and moving in the delivery direction (the direction indicated by the arrow X) are obstructed by the shutter mechanism 77 (the details will be described later). The releasing mechanism 75 pushes down the bill with the impeller 102, with the movement of the bill in the delivery direction being obstructed, in the direction of the front plate 82 (indicated by the arrow Y), while maintaining the bill parallel to the front plate 82. This prevents the bill delivered by the releasing mechanism 75 from colliding with the next bill to be delivered. Thus, a number of bills can be securely stacked.

The upper cover 76 has a first guide 104 and a second guide 105.

The first guide 104 is provided above the releasing mechanism 75, and is in parallel to the front plate 82 of the bottom forming member 74.

The second guide 105 is connected to the upper end of the first guide 104, and is also in parallel to the front plate 82 of the bottom forming member 74. The upper end of the second guide 105 approximately reaches the upper face 25 of the machine body 10.

The second guide 105 has a protruding member 106. The protruding member 106 protrudes from the middle of the second guide 105 and is perpendicular to the second guide 105. The upper end of the protruding member 106 approximately reaches the upper face 25 of the machine body 10. The front face 108 of the protruding member 106 faces upwards and to the front.

In the upper portion of the second guide 105, an insertion groove 107 is made. When the operator removes the stacked bills S in the first stacker 69, the operator can insert his finger through the insertion groove 107. Therefore, the operator can easily remove the stacked bills S.

A stacking space 109 for stacking the bills is defined by the bottom forming member 74 and the upper cover 76. The stacking space 109 has an upper opening which is an output opening 110 for allowing the operator to remove the bills. The output opening 110 is defined by the upper end of the upper plate 83 of the bottom forming member 74, the upper ends of both the side plates 86 of the bottom forming member 74, and the upper end of the second guide 105 of the upper cover 76.

The first stacker 69 has a remaining bill detecting sensor 111 for detecting the bill remaining inside the stacking space 109 of the first stacker 69. The remaining bill detecting sensor 111 outputs the result of the detection to the controller 17. The remaining bill detecting sensor 111 comprises a light emitter and a light receiver. The light emitter and the light receiver are disposed outside the front plate 82 of the bottom forming member 74 and outside the upper cover 76, respectively. The front plate 82 of the bottom forming member 74 and the upper cover 76 have holes (not shown) which allow the light from the light emitter to reach the light receiver.

When the light receiver detects the light emitted from the light emitter, the remaining bill detecting sensor 111 detects that there is no bill in the stacking space 109. In contrast, when the light receiver does not detect the light emitted from the light emitter, the remaining bill detecting sensor 111 finds a bill remaining in the stacking space 109.

The first stacker 69 has a full-state detecting sensor 114 for detecting whether the stacking space 109 of the first stacker 69 is full of bills or not. The full-state detecting sensor 114 outputs the result of the detection to the controller 17. The full-state detecting sensor 114 comprises a light emitter and a light receiver. The light emitter and the light receiver are separately disposed outside both the side plates 86 of the bottom forming member 74 and near the upper cover 76. The side plates 86 of the bottom forming member 74 have holes 115 (only one of the pair is shown) which allows the light from the light emitter to reach the light receiver.

When the light receiver does not detect the light from the light emitter, the full-state detecting sensor 114 detects that the stacking space 109 is full of bills. In contrast, when the light receiver detects the light from the light emitter, the full-state detecting sensor 114 detects that the stacking space 109 is not full of bills.

Figure 5:
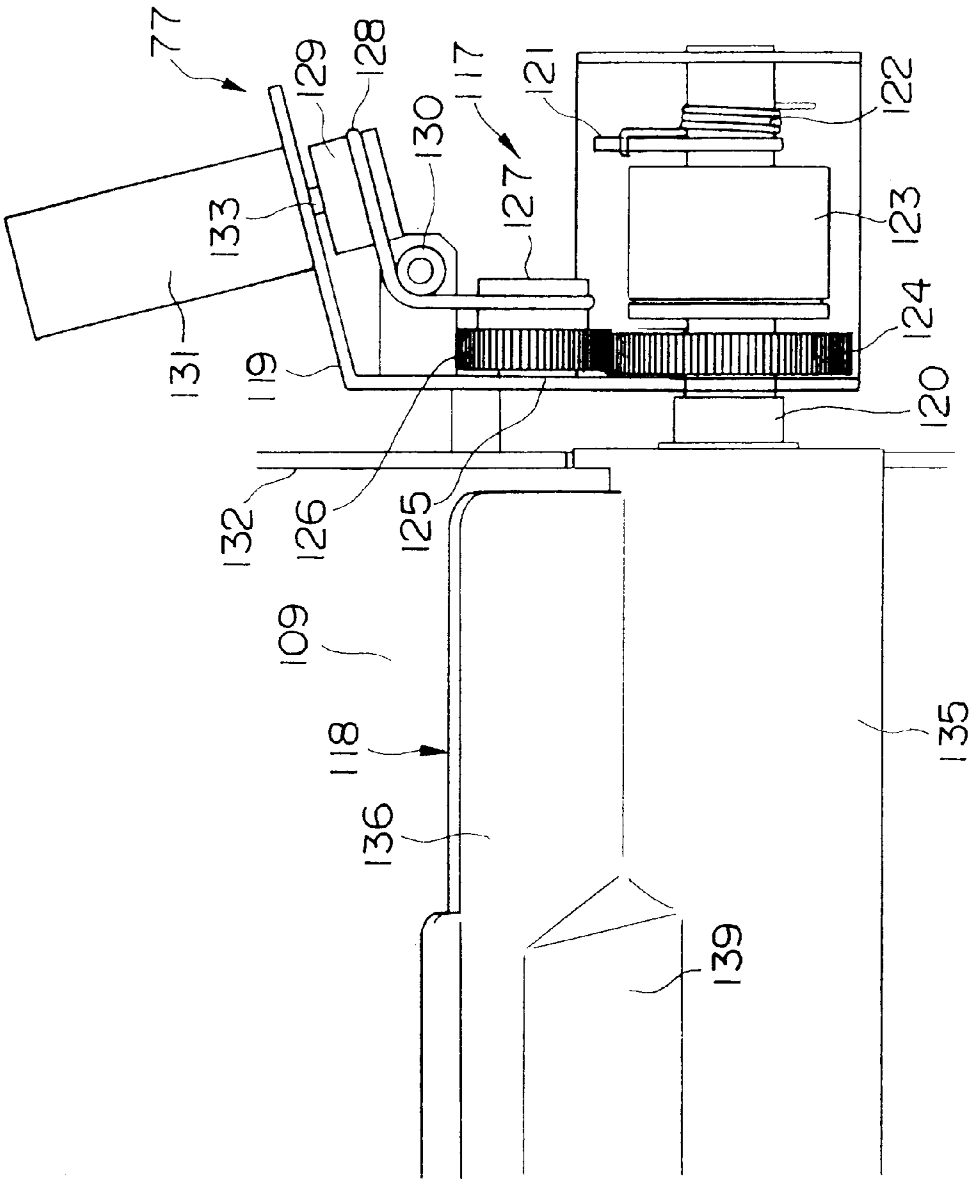
FIG. 5 is a top view showing the stacker in an embodiment of the bill arranger of the present invention.

The shutter mechanism 77 is controlled by the controller 17, and has a shutter driver 117 and a shutter 118 as shown in FIG. 5.

The shutter driver 117 comprises a supporting member 119, a pair of rotational shafts 120 (only one of them is shown), a detection portion 121, a spring 122, a clutch 123, a gear 124, a fixed shaft 125, a gear 126, a pulley 127, a belt 128, a pulley 129, a pair of guide rollers 130 (only one of them is shown), and a shutter drive motor 131.

The supporting member 119 is fixed in the right side of the right frame 132 of the stacking space 109.

Although not shown, the same supporting member is fixed in the left side of the left frame of the stacking space 109.

One of the rotational shafts 120 is rotatably mounted on the right side supporting member 119 so that the shaft extends in the side-to-side direction. Although not shown, the other rotational shaft is rotatably mounted on the left side supporting member. These rotational shafts are disposed coaxially.

The detection portion 121 is fixed to the rotational shaft 120.

The spring 122 urges the rotational shaft 120 so that its upper portion moves toward the rear.

The clutch 123 can be switched by control of the controller 17, and is attached to the rotational shaft 120. The gear 124 is attached to the clutch 123. The clutch 123 selects fixing or detaching the gear 124 to or from the rotational shaft 120.

The fixed shaft 125 is fixed to the supporting member 119. This fixed shaft 125 supports the gear 126 rotatably. The gear 126 always meshes with the gear 124 of the clutch 123.

The pulley 127 is fixed to the gear 126.

The shutter drive motor 131 is supported by the supporting member 119, and has a rotational shaft 133. The controller 17 controls the rotation, stopping, and the direction of the rotation of the rotational shaft 133 driven by the shutter drive motor 131. A pulley 129 is fixed to the rotational shaft 133.

The guide roller 130 is disposed between the shutter drive motor 131 and the gear 126.

One end of the belt 128 is wound around the pulley 127 while the other end is wound around the pulley 129, and the middle portion of the belt 128 is put around a pair of guide rollers 130.

The shutter 118 is fixed between a pair of the rotational shafts 120. The shutter 118 comprises a curving plate 135, a flat plate 136, a pair of projections 137, and an inclined portion 139.

The curving plate 135 has a semicircular cylindrical shape defined between two imaginary planes passing through its center. The center axis of the curving plate 135 corresponds to that of the rotational axis 120.

The projections 137, as shown in FIG. 6, project from the right and left portions of the curving plate 135, and form the cylindrical shapes continuously with the curving plate 135. That is, the center axes and radiuses of the projections 137 correspond to those of the curving plate 135.

As shown in FIG. 4, the flat plate 136 is provided opposite to the projections 137 of the curving plate 135. The entire curving plate 135 is disposed to one side with respect to an imaginary line extending from the flat plate 136.

The inclined portion 139 connects the curving plate 135 and the flat plate 136. The inclined portion 139 is inclined with respect to the flat plate 136 so as to tend toward the top of the curving plate 135. The inclined portion 139 is formed in the middle of the right-left width of the shutter 118.

The shutter driver 117 drives the shutter drive motor 131 in one direction while connecting the gear 124 with the rotational shaft 120 by the clutch 123. Thus, the rotation of the rotational shaft 133 of the shutter drive motor 131 is transmitted via the pulley 129, the belt 128, the pulley 127, the gear 126, the gear 124, and the clutch 123 to the rotational shaft 120. The shutter 118, as shown in FIGS. 4 and 7, moves the flat plate 136 toward the rear of the curving plate 135 while moving the projections 137 toward the front of the curving plate 135, so that the output opening 110 is closed. In this situation, the curving plate 135 is convex.

Then, the shutter driver 117 stops the shutter drive motor 131 while connecting the gear 124 with the rotational shaft 120 by the clutch 123. Therefore, the shutter 118 is fixed while closing the output opening 110.

When in the closed state, the shutter 118 completely prevents removal of the stacked bill in the stacking space 109.

Figure 8:
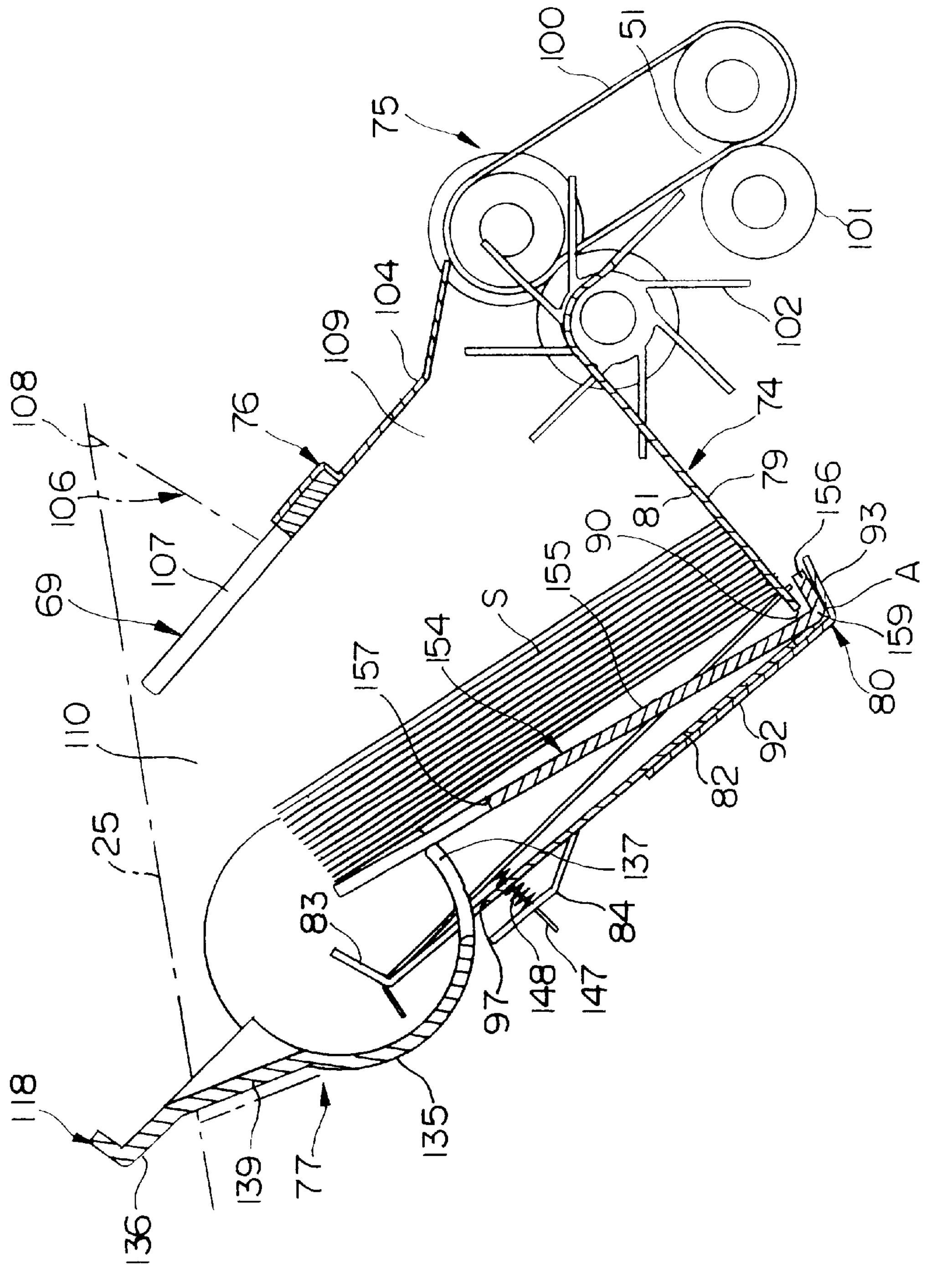
FIG. 8 is a cross-sectional side view showing the stacker, whose shutter is opened, in an embodiment of the bill arranger of the present invention.

While connecting the gear 124 with the rotational shaft 120 by the clutch 123, the shutter driver 117 drives the shutter drive motor 131 in the opposite direction. Thus, the rotation of the rotational shaft 133 of the shutter drive motor 131 is transmitted via the pulley 129, the belt 128, the pulley 127, the gear 126, the gear 124, and the clutch 123 to the rotational shaft 120. The shutter 118, as shown in FIG. 8, rotates the flat plate 136 toward the upper front. Thus, the shutter 118 opens the output opening 110.

As the shutter 118 is rotated to the fully-opened point, the projections 137 are moved toward the rear, and pass through the insertion grooves 97 of the front plate 82 of the bottom forming member 74 into the stacking space 109.

When the shutter 118 has fully opened the output opening 110, the flat plate 136 is above the curving plate 135. Further, the flat plate 136 is inclined so that the upper end of the flat plate 136 is nearer to the front than its lower end.

In this situation, the shutter driver 117 stops the shutter drive motor 131 while the connecting the gear 124 with the rotational shaft 120 by the clutch 123. Thus, the shutter 118 is fixed while fully opening the output opening 110.

The shutter 118, which is opened, allows removal of the stacked bills in the stacking space 109.

The shutter driver 117 can operate the clutch 123 to disconnect the gear 124 from the rotational shaft 120. Then, the shutter 118 allows the operator to manually open or close the output opening 110. When the clutch 123 disconnects the gear 124 from the rotational shaft 120, the spring 122 urges the shutter 118 toward the direction to close the output opening 110. Therefore, unless the operator operates the shutter 118, the shutter 118 closes the output opening 110.

When the shutter 118 closes the output opening 110, the flat plate 136 is positioned in front of the bill delivered by the releasing mechanism 75. The closed shutter 118 obstruct bills moving in the delivery direction from the releasing mechanism 75. Thus, the releasing mechanism 75 drives the impeller 102 to hit the end of the delivered bill toward the front plate 82.

The shutter driver 117 has a closed shutter sensor 141, and an opened shutter sensor 142.

The closed shutter sensor 141 judges, based on the presence or absence of the detection portion 121, whether the shutter 118 is completely closing the output opening 110 or not (as shown in FIGS. 4 and 7).

The opened shutter sensor 142 judges, based on the presence or absence of the detection portion 121, whether the shutter 118 has completely opened the output opening 110 or not (as shown in FIG. 8).

The closed shutter sensor 141 and the opened shutter sensor 142 output the results of the detection to the controller 17.

As shown in FIGS. 6 and 7, the first stacker 69 has a guide mechanism (guide) 144. The guide mechanism 144 comprises a pair of right and left guide plates 145, core rods 147 attached to the both guide plates 145, and springs 148.

Each of the guide plates 145 comprises a principal plate 149, an engaging portion 150, and a plurality of guide portions 151.

The engaging portion 151 is formed at the upper edge of the principal plate 149, and is perpendicular to the principal plate 149.

The guide portion 150 protrudes from the lower edge of the principal plate 149, and is in the same plane as the principal plate 149.

The guide plates 145 are disposed above the bottom forming member 74. The engaging portions 150 of the guide plates 145 are engaged with the upper engaging long openings 96 of the front plate 82 of the bottom forming member 74, and the guide portions 151 are inserted into the guide groove 89 of the rear plate 81.

In this situation, the guide plates 145 are supported at the bent portion 152 between the engaging portions 150 and the principal plates 149 by the front plate 82. Thus, the guide plates 145 are rotatably supported by the first stacker 69. The center of the rotation is the contact point B of the bent portion 152 with the front plate 82. The guide plates 145 are rotatably supported at the output opening 110 of the first stacker 69.

The rotational ranges of the guide plates 145 depend on the sizes of the guide groove 89 through which the guide portions 151 are inserted.

The core rods 147 are fixed to the principal plates 149 of the guide plates 145, and are perpendicular to the principal plates 149. The core rods 147 are inserted through the long hole 95 of the front plate 82 of the bottom forming member 74 and through the long holes 98 of the supporting plate 84.

The springs 148 are wound around the core rods 147, and intervene between the principal plate 149 and the supporting plate 84. The springs 148 urges the guide plates 145 so that the guide portions 151 are positioned at the rear ends of the guide grooves 89.

The stacking space 109 is defined below the upper cover 76 above the guide plates 145.

According to the above construction, when there is no bill on the guide plates 145, the springs 148 urge the guide plates 145 so that the guide portions 151 are positioned at the rear ends of the guide grooves 89 as shown in FIG. 7. In this situation, the angle of the guide plates 145 with respect to the front plate 82 becomes maximized. That is, the lower ends of the guide plates 145 are positioned above and behind the lower edge of the front plate 82, thereby minimizing the capacity of the stacking space 109.

When the guide plates 145 are in the above described condition, the releasing mechanism 75 delivers the bill into the stacking space 109, and the impeller 102 pushes down the bill toward the front plate 82. Then, the bill drops on the guide plates 145 or on the bills stacked on the guide plates 145. When only the first bill is placed on the guide plates 145, the angle of the first bill with respect to the horizontal plane is minimized.

As the bills are successively delivered onto the guide plates 145, the guide plates 145 are rotated about the bent portion 152 by the weight of the bills. The angle of the rotation of the guide plates 145 depends on the weight of the bills. As the weight of the bills increases, the angle between the guide plates 145 and the front plate 82 decreases. That is, as the weight of the bills increases, the guide plates 145 increases the capacity of the stacking space 109.

In other words, the guide plates 145 moves, depending on the weight of the bills delivered onto the first stacker 69 from the conveyer 12. The springs 148 urges the guide plates 145, which then move to a position corresponding to the weight of the bills delivered onto the first stacker 69 from the conveyer 12.

When more than a predetermined amount of bills is loaded onto the guide plates 145, the guide plates 145 shorten the springs 148 so that the guide portions 151 are positioned at the front end of the guide groove 89. In this situation, the angle of the guide plates 145 with respect to the front plate 82 is minimized, that is, zero. The capacity of the stacking space 109 is maximized. The angle of the bills on the guide plates 145 with respect to the horizontal plane is maximized.

Thus, the guide plates 145 change the positions of the stacked bills S, depending on the weight of the stacked bills in the first stacker 69.

The first stacker 69 further comprises a pusher (position changer) 154 which is shown in FIGS. 4, 6, and 8. The pusher 154 is disposed between the right and left guide plates 145.

The pusher 154 has a principal plate 155, and an engaging portion 156.

The engaging portion 156 is formed at the lower edge of the principal plate 155, and is perpendicular to the principal plate 155.

A cut-out portion 157 is made in the upper edge of the principal plate 155. A pair of oblong holes 158 extending in the vertical direction are made in the lower right and left portions of the principal plate 155. These oblong holes 158 allows the light from the light emitter of the remaining bill detecting sensor 111 to pass through.

The pusher 154 is disposed above the bottom forming member 74. The engaging portion 156 is engaged with the lower engaging long hole 90 of the rear plate 81 of the bottom forming member 74 so that the pusher 154 is disposed on the engaging plate 93. The bent portion 159 between the engaging portion 156 and the principal plate 155 is supported by the supporting member 80.

Thus, the pusher 154 is rotatably supported by the first stacker 69. The center of the rotation is the contact point A between the supporting member 80 and the bent portion 159.

The upper portion of the principal plate 155 can be in contact with the projections 137 of the shutter 118.

As shown in FIG. 4, when the shutter 118 closes the output opening 110, the projections 137 of the shutter 118 do not come in contact with the principal plate 155. As shown in FIG. 8, as the shutter 118 rotates to open the output opening 110, the projections 137 come in contact with the front side of the principal plate 155. This contact occurs just before the shutter 118 completely opens the output opening 110. After the contact until the complete opening of the output opening, the projections 137 push the principal plate 155 toward the upper cover 76.

As shown in FIG. 4, when the shutter 118 of the shutter mechanism 77 is closed, the angle of the pusher 154 with respect to the front plate 82 is minimized, that is, zero because of its own weight. The pusher 154 overlies on the front plate 82.

In this situation, the releasing mechanism 75 delivers the bill roughly in parallel to the front plate 82 of the bottom forming member 74, and the impeller 102 pushes down the bill onto the front plate 82 while maintaining the direction of the bill. Then, the bill is placed onto the pusher 154 or onto the guide plates 145.

Then, when the controller 17 opens the shutter 118 of the shutter mechanism 77, the pusher 154 rotates with the shutter 118. The pusher 154 rotates so that its angle with respect to the front plate 82 becomes maximized. Then, the upper portions of the stacked bills S are moved toward the upper rear. That is, the pusher 154 changes the positions of the stacked bills S when the shutter 118 is opened by control of the controller 17. The upper portions of the stacked bills S are separated from the front plate 82 of the bottom forming member 74. In other words, the upper portions of the stacked bills S are lifted. As the result, it becomes easy to remove the bills from the output opening 110.

The guide plates 145 may be made from an elastic resin which is deformable by the weight of the bills delivered from the conveyer 12 into the first stacker 69.

Figure 9:
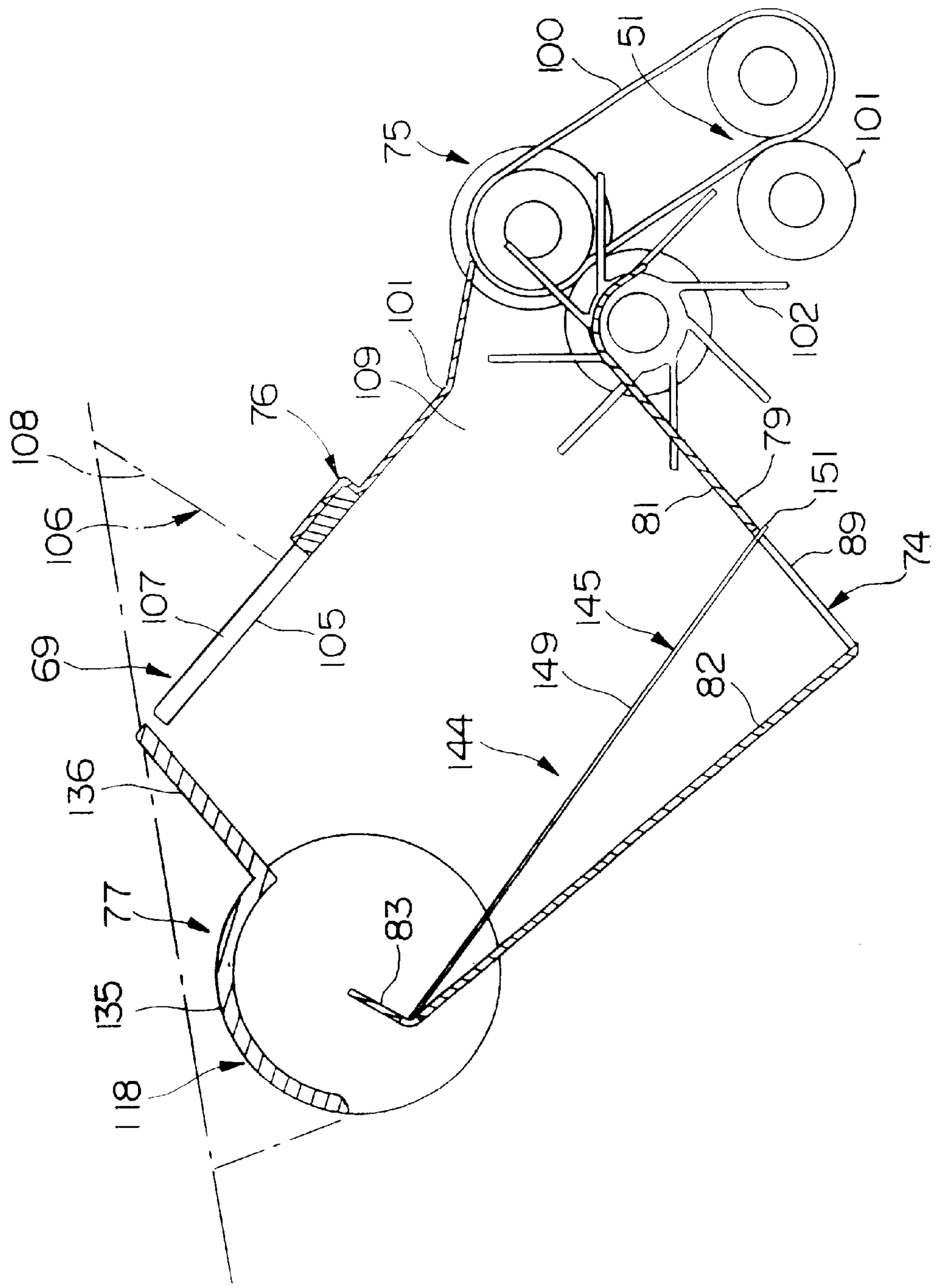
FIG. 9 is a cross-sectional side view showing the stacker in an embodiment of the bill arranger of the present invention, and particularly, the details of another example of a guide mechanism of the present invention.

In this case, as shown in FIG. 9, the upper edges of the guide plates 145 are fixed to the boundary between the front plate 82 and the upper plate 83 of the bottom forming member 74. When the bills are placed on the guide plates 145, the guide plates 145 are deformed by the weight of the bills. As the weight of the bills increases, the angle between the guide plates 145 and the front plate 82 decreases.

Figure 3:
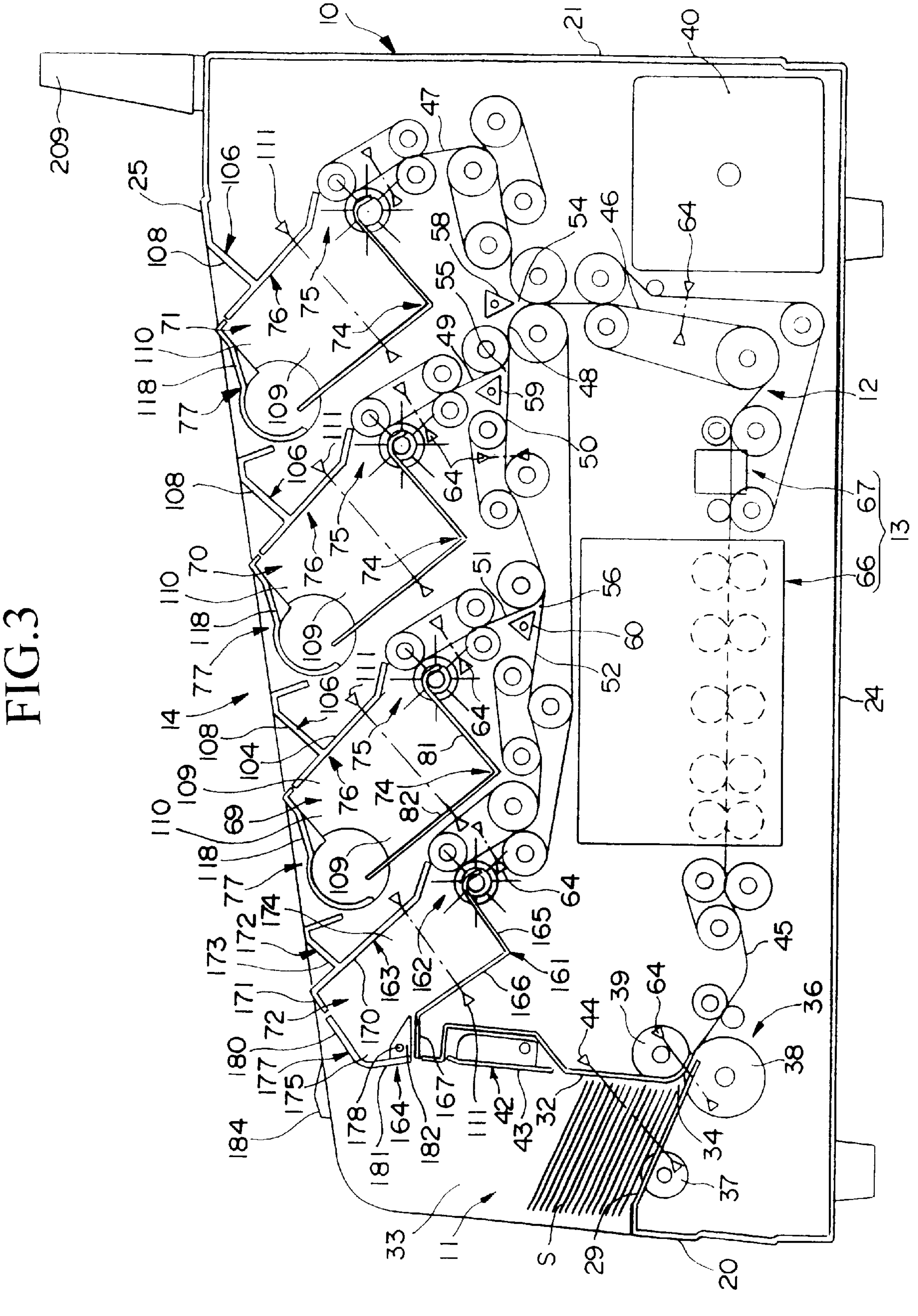
FIG. 3 is a cross-sectional view showing an embodiment of the bill arranger of the present invention.

As shown in FIG. 3, the second stacker 70 is constructed in a manner similar to the first stacker 69, except that the releasing mechanism 75 is connected to the fifth conveyer path 49.

Also, the third stacker 71 is constructed in a manner similar to the first stacker 69, except that the releasing mechanism 75 is connected to the third conveyer path 47.

Each of the stackers 69 to 71 has the shutter 118, and the shutter driver 117 which includes the shutter drive motor 131 for opening and closing the shutter 118.

Next, the rejecter 72 will now be explained with reference to FIG. 3.

The rejecter 72 comprises a bottom forming member 161, a releasing mechanism 162, an upper cover 163, and an opening and closing mechanism 164.

The bottom forming member 161 comprises a rear plate 165, a front plate 166, an upper plate 167, and a pair of side plates (not shown).

The rear plate 165 is inclined approximately at the same angle as the rear plate 81 of the first stacker 69 so that the rear end of the rear plate 165 is above its front end. The length from the front to the rear of the rear plate 165 of the rejecter 72 is shorter than that of the rear plate 81 of the first stacker 69.

The front plate 166 is formed from the front end of the rear plate 165 toward the upper front. The front plate 166 is inclined approximately at the same angle as the front plate 82 of the first stacker 69.

The upper plate 167 is formed from the upper end of the front plate 166 toward the front. The upper plate 167 extends horizontally. The front end of the upper plate 167 corresponds to the upper edge of the loader rear face 32 of the loader 11.

Both the side plates are disposed at both sides of the front plate 166 and the rear plate 165. The side plates are in parallel to the side faces 22 of the machine body 10.

The releasing mechanism 162 is constructed in a manner similar to the releasing mechanism 75 of the first stacker 69, except that the releasing mechanism 162 is connected to the eighth conveyer path 52.

The upper cover 163 is disposed above the releasing mechanism 162. The upper cover 163 has a first plate 170 and a second plate 121.

The first plate 170 is in parallel to the front plate 166 of the bottom forming member 161. The upper edge of the first plate 170 reaches the upper face 25 of the machine body 10.

The second plate 171 is formed from the upper end of the first plate 170 toward lower front.

The upper cover 163 has an extension member 172 which extends from the middle of the first plate 170 and is perpendicular to the first plate 170. The upper end of the extension member 172 reaches the upper face 25 of the machine body 10. The front face 173 of the extension member 172 faces front upward.

The space within the bottom forming member 161 and the upper cover 163 is a stacking space 174 for stacking bills. An upper opening of the stacking space 174 is a reject opening 175 for allowing an operator to remove the bills. That is, the reject opening 175 is defined within the upper edge of the front plate 166 of the bottom forming member 161, the upper edges of the side plates of the bottom forming member 161, and the front edge of the second plate 171 of the upper cover 163.

The distance between the front plate 166 of the bottom forming member 161 of the rejecter 72 and the first plate 170 of the upper cover 163 is shorter than the distance between the front plate 82 of the bottom forming member 74 and the first guide 104 in the first stacker 69. Therefore, the stacking space 174 of the rejecter 72 is smaller than the stacking space 109 of the first stacker 69.

Figure 2:
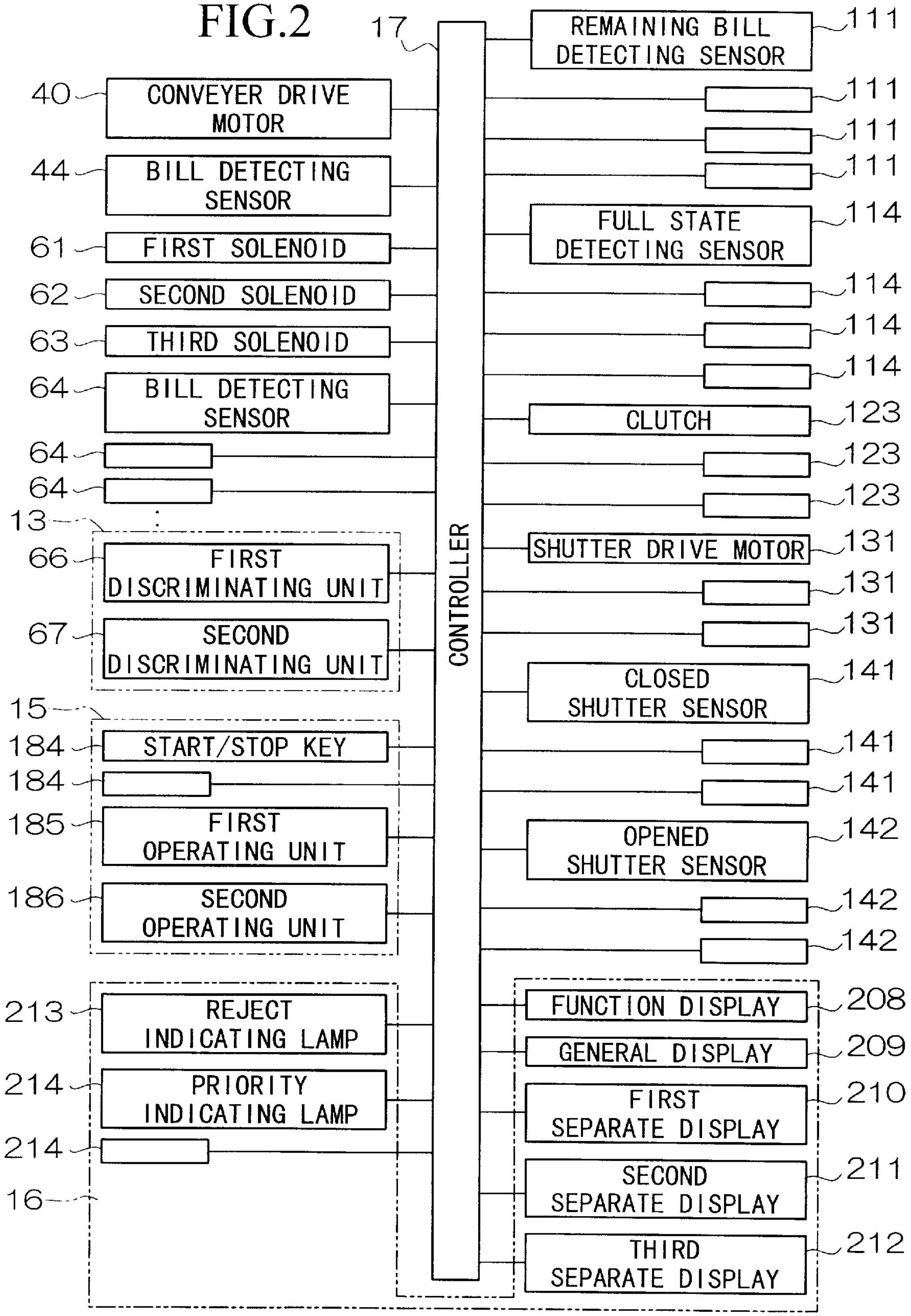
FIG. 2 is a block diagram showing an embodiment of the bill arranger of the present invention.

The rejecter 72 has a remaining bill detecting sensor 111 and a full-state detecting sensor 114 in a manner similar to the first stacker 69 (see FIG. 2). The rejecter 72 has holes which allows light from a light emitter to reach a light receiver.

The opening and closing mechanism 164 can be manually opened and closed by the operator, and has a lid 177, a rotational shaft 178, and a spring (not shown).

The rotational shaft 178 is disposed above the upper plate 167 of the bottom forming member 161, and extends in the side-to-side direction.

The spring urges the rotational shaft 178 so that its upper portion rotates to the rear.

The lid 177 is fixed to the rotational shaft 178. The lid 177 has a first flat plate 180, a second flat plate 181, and a supporting member 182.

The first flat plate 180 and the second flat plate 181 forms an obtuse angle.

The supporting member 182 is formed at the end of the first flat plate 180 opposite to the second flat plate 181.

The supporting member 182 of the lid 177 is fixed to the rotational shaft 178.

Unless an operator operates the lid 177, the first flat plate 180 stays behind the second flat plate 181, and the second flat plate 181 is raised, so that the reject opening 175 is closed.

When the lid 177 closes the reject opening 175, the first flat plate 180 is positioned in front of the bills delivered by the releasing mechanism 162. The closed lid 177 obstructs the bills which move in the delivery direction from the releasing mechanism 162. Thus, the releasing mechanism 162 drives the impeller 102 to hit the end of the delivered bill.

The lid 177, which closes the reject opening 175, can be manually rotated by the operator. The lid 177 is rotated forward about the rotational shaft 178. Thus, the reject opening 175 is opened. When the operator releases the lid 177, the lid 177 is rotated by the urging force of the spring so that the reject opening 175 is closed.

As described above, the operator can manually open the lid 177 of the rejecter 72 to open the reject opening 175. In contrast, the shutters 118 of the stackers 69 to 71 can prevent the manual opening or closing of the output openings 110 by an operator as the need arises. Further, the shutters 118 of the stackers 69 to 71 can be automatically opened or closed.

Operating Device

The operating device 15, as shown in FIGS. 1 and 2, has a pair of start/stop keys 184, a first operating unit 185, and a second operating unit 186.

One of the start/stop keys 184 is provided in the left side of the rejecter 72 on the upper face 25 of the machine body 10. The other start/stop key 184 is provided in the right side of the rejecter 72 on the upper face 25 of the machine body 10. These start/stop keys 184 output signals to the controller 17 each time they are pushed.

The first operating unit 185 is provided in the left side of the second stacker 70 on the upper face 25 of the machine body 10.

Figure 10:
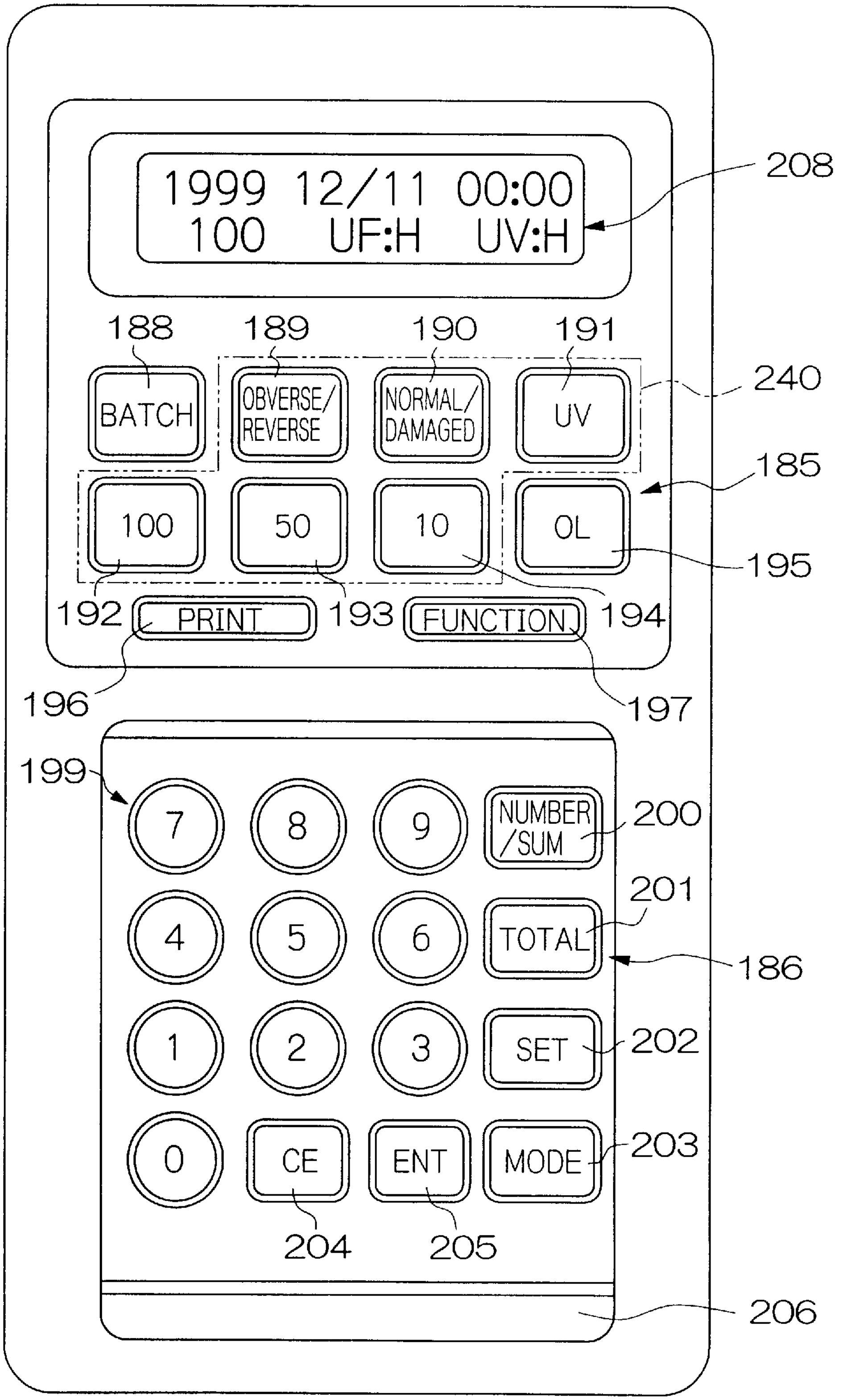
FIG. 10 is a perspective view showing a function display, a first operating unit, and a second operating unit of an embodiment of the bill arranger of the present invention.
Figure 12:
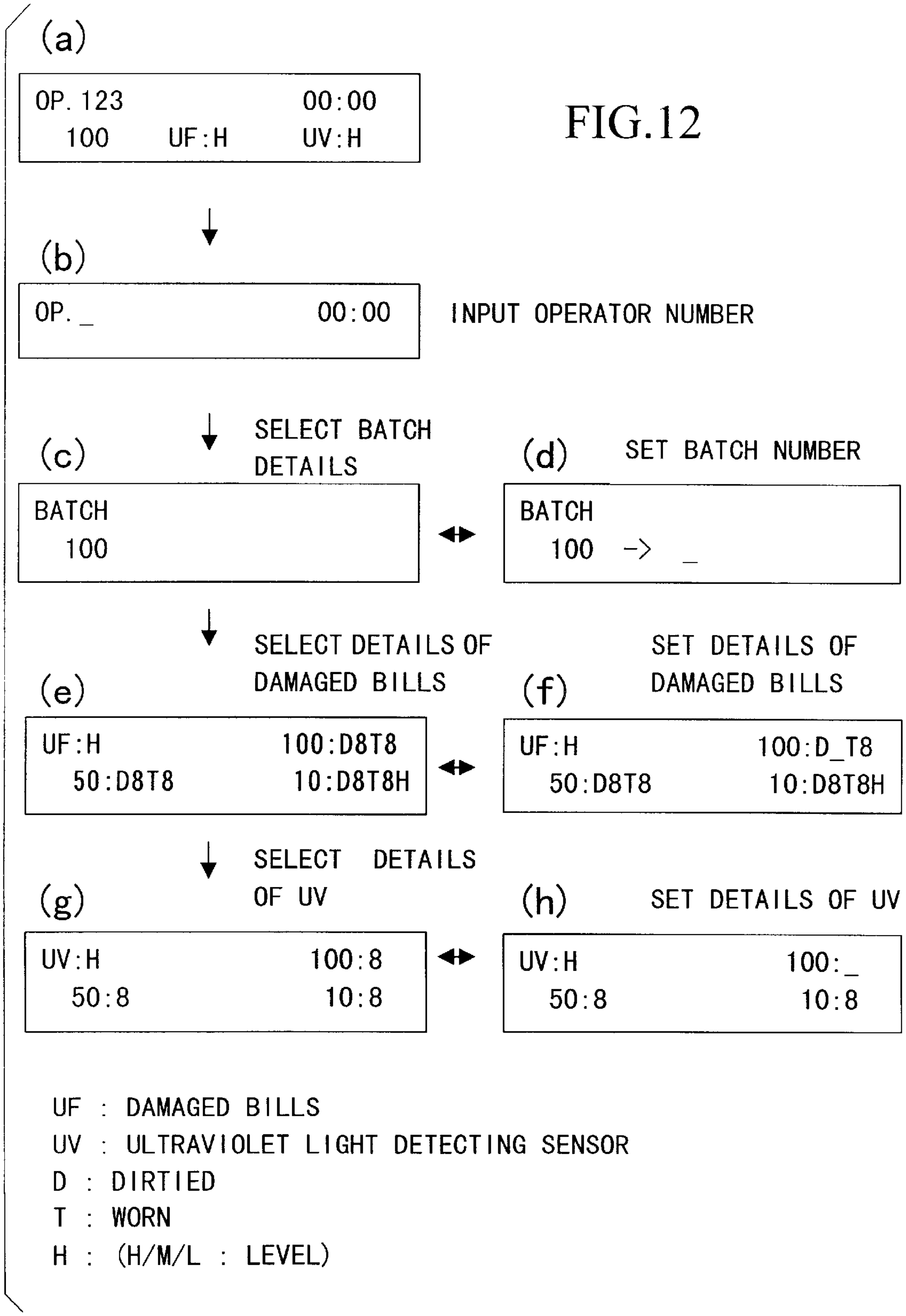
FIG. 12 is a diagram showing the displays for function setting of an embodiment of the bill arranger of the present invention.

The first operating unit 185, as shown in FIG. 10, has a batch key 188 indicating the character "BATCH", an obverse/reverse key 189 indicating the character "OBVERSE/REVERSE", a normal/damaged key 190 indicating the character "NORMAL/DAMAGED", a UV key 191 indicating the character "UV", a 100 key 192 indicating the number "100", a 50 key 193 indicating the number "50", a 10 key 194 indicating the number "10", an OL key 195 indicating the character "OL", a print key 196 indicating the character "PRINT", and a function key 197 indicating the character "FUNCTION." These keys 188 to 197 output signals to the controller 17 each time they are pushed.

The first operating unit 185 is not equipped with any lid, and is always exposed. The reason for this is that the first operating unit 185 is frequently operated.

The second operating unit 186 is provided in front of the first operating unit 185 on the upper face 25 of the machine body 10. The second operating unit 186 is provided adjacent to the first operating unit 185.

The second operating unit 186 has ten keys 199 which includes 0 to 9 keys indicating the characters "0" to "9", a number/sum key 200 indicating the character "NUMBER/SUM", a total key 201 indicating the character "TOTAL", a set key 202 indicating the character "SET", a mode key 203 indicating the character "MODE", a CE key 204 indicating the character "CE", and an ENT key 205 indicating the character "ENT." These keys 199 to 205 output signals to the controller 17 each time they are pushed.

The second operating unit 186 has a manually slidable cover 206, which exposes or covers the keys. The reason for this is that the second operating unit 186 is not frequently used.

The functions of the keys 184, 188 to 197, and 199 to 205 are shown in the table of FIG. 11.

In this table, the keys marked with ○ in the "SORT SETTING" sections are used for setting a way to sort the bills, which are loaded in the loader 11, into the stackers 69 to 71.

The keys marked with ○ in the "SORT SETTING" sections are mainly used for the following function settings:

1) Setting the Number of Bills for a Batch Process

The batch process includes dividing the bills in the loader 11 into groups each of which has a predetermined number of bills, e.g., 100 bills), 2) Setting a Discrimination Level for Detecting a Damaged Bill The discrimination level is a criterion for judging whether the bill, detected by the first discriminating unit 66, is a normal note or a damaged note. The discrimination level can be set to one of H (high level), M (medium level), and L (low level). When the discrimination level is set to H, the bill is judged to be a damaged note even when the damage or dirt of the bill is not serious. In contrast, when the discriminating level is set to L, the bill is not judged to be a damaged note even when the bill is seriously dirtied or worn.

3) Setting a UV Discrimination Level

The UV discrimination level is a criterion for detecting the presence or absence of the visible light which is produced by the ultraviolet light emitted from the second discriminating unit 67 onto the bill and is reflected from the bill. The UV discrimination level can be set to one of H (high level), M (medium level), and L (low level). When the UV discrimination level is set to L, the reflected light can be detected even when there is a small quantity of the light reflected from the bill. In contrast, when the UV discrimination level is set to H, the reflected light cannot be detected even when there is a large quantity of light reflected from the bill.

Although the number of keys 184, 188 to 197, and 199 to 205 is limited, each key has plural functions to enable various settings. The main functions of the keys 184, 188 to 197, and 199 to 205 will now be explained.

To start or stop the sorting process, an operator pushes the start/stop key 184. After the completion of the sorting process, the operator may push this key to open the shutter 118.

When in a standby state the bill arranger does not perform the sorting process, one of the start/stop keys 184 outputs a signal. Then, the controller 17 sets the entire bill arranger exclusively under the control of this active start/stop key 184. That is, the signal from the other start/stop key 184 is rejected until the bill arranger enters the standby state.

To combine the sorting process with a batch process, the batch key 188 is pushed by the operator. To display the remaining bills in the stackers 69 to 71 on the display 16 during the sorting process, the batch key 188 is pushed by the operator.

To select an obverse/reverse sorting process, the obverse/reverse key 189 is pushed by the operator. The obverse/reverse sorting process is separating the obverse bills from the reverse bills loaded in the loader 11.

To select a normal/damaged sorting process, the normal/damaged key 190 is pushed by the operator. To display the discrimination level for a damaged bill on the display 16, the normal/damaged key 190 is pushed by the operator. The normal/damaged sorting process divides the bills in the loader 11 into normal notes and damaged notes.

To display the type of the bills delivered to the rejecter 72 on the display 16, the UV key 191 is pushed by the operator.

To select the denomination A, the 100 key 192 is pushed by the operator. For example, when the bill arranger is used in Japan, the denomination A is 10,000 yen notes, which is then represented by "100."

To select the denomination B, the 50 key 193 is pushed by the operator. For example, when the bill arranger is used in Japan, the denomination B is 5,000 yen notes, which is then represented by "50."

To select the denomination C, the 10 key 194 is pushed by the operator. For example, when the bill arranger is used in Japan, the denomination C is 1,000 yen notes, which is then represented by "10."

To connect the bill arranger with another device and establish communication therebetween, the OL key 195 is pushed by the operator.

Thus, one of plural sorting process modes for determining a way to sort the bills loaded in the loader 11 can be selected by the batch key 188, the obverse/reverse key 189, the normal/damaged key 190, the UV key 191, the 100 key 192, the 50 key 193, the 10 key 194, and the set key 202.

To print out the setting data or the data obtained by the process, the print key 196 is pushed by the operator.

To select one of the function settings, the function key 197 is pushed by the operator.

The ten keys 199 are pushed to input numerical values.

To indicate one of the number of notes (hereinafter referred to as "number indication") and the sum of money (hereinafter referred to as "sum indication") on the display 16, the number/sum key 200 is pushed by the operator.

Before the starting of the sorting process, one of the number indication or the sum indication is initially displayed.

To display one of the total values (hereinafter referred to as "total indication") and the sub total value (hereinafter referred to as "subtotal indication") on the display 16, the total key 201 is pushed by the operator. The sub total values are the number or the sum of bills actually stacked in each stacker 69 to 71, and the total number or the total sum of bills in the stacker 69 to 71. The total values are the number or the sum of bills fed into each stacker 69 to 71 in one sorting process, and the total number or the total sum of bills in the stacker 69 to 71.

Before the starting of the sorting process, one of the sub total value or the total value is initially displayed.

To initialize the setting, the set key 202 is pushed by the operator. To set the process mode, the mode key 203 is pushed by the operator. To cancel an input value, the CE key 204 is pushed by the operator. To fix the input data, the ENT key 205 is pushed by the operator.

Display

The display 16 has a function display 208, a general display (general display means) 209, a first separate display (display means) 210, a second separate display (display means) 211, a third separate display (display means) 212, a reject indicating lamp 213, and a pair of priority indicating lamps 214. The functions of these members may be changed, and are controlled by the controller 17.

The function display 208, as shown in FIG. 1, is provided at the rear of the first operating device 185 on the upper face 25 of the machine body 10, and is disposed adjacent to the first operating unit 185. The function display 208 displays setting data and guidance when setting the function. Further, the function display 208 can display the information other than that to be displayed by the general display 209 and the separate displays 210 to 212.

Figure 15:
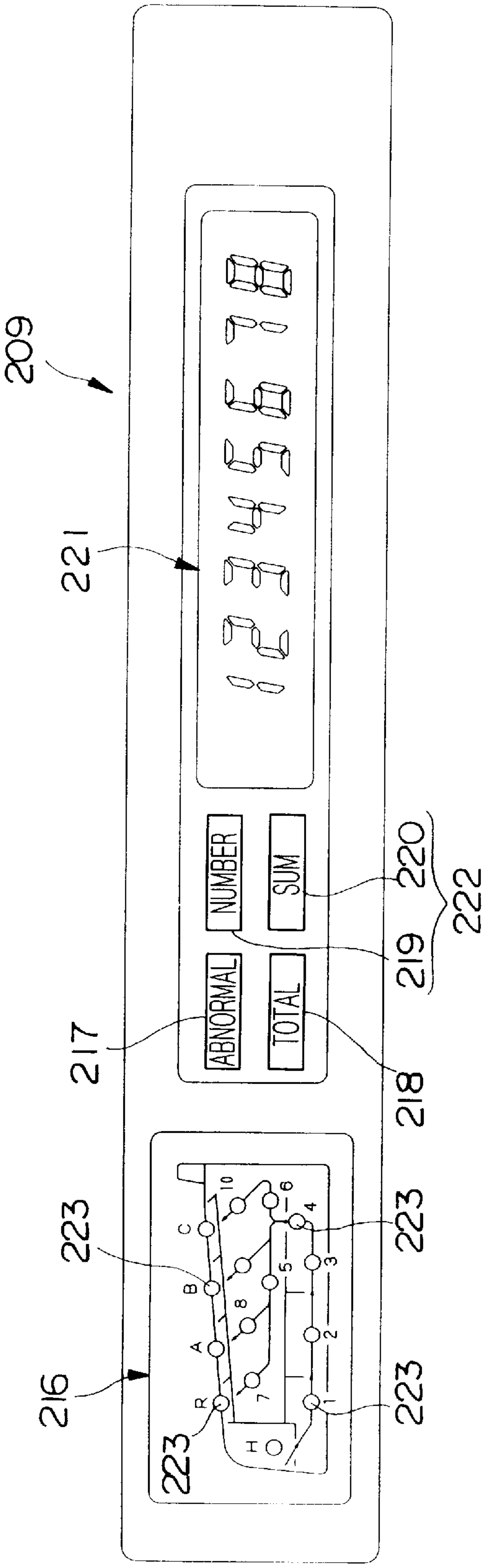
FIG. 15 is a front view showing a general display of an embodiment of the bill arranger of the present invention.
Figure 16:
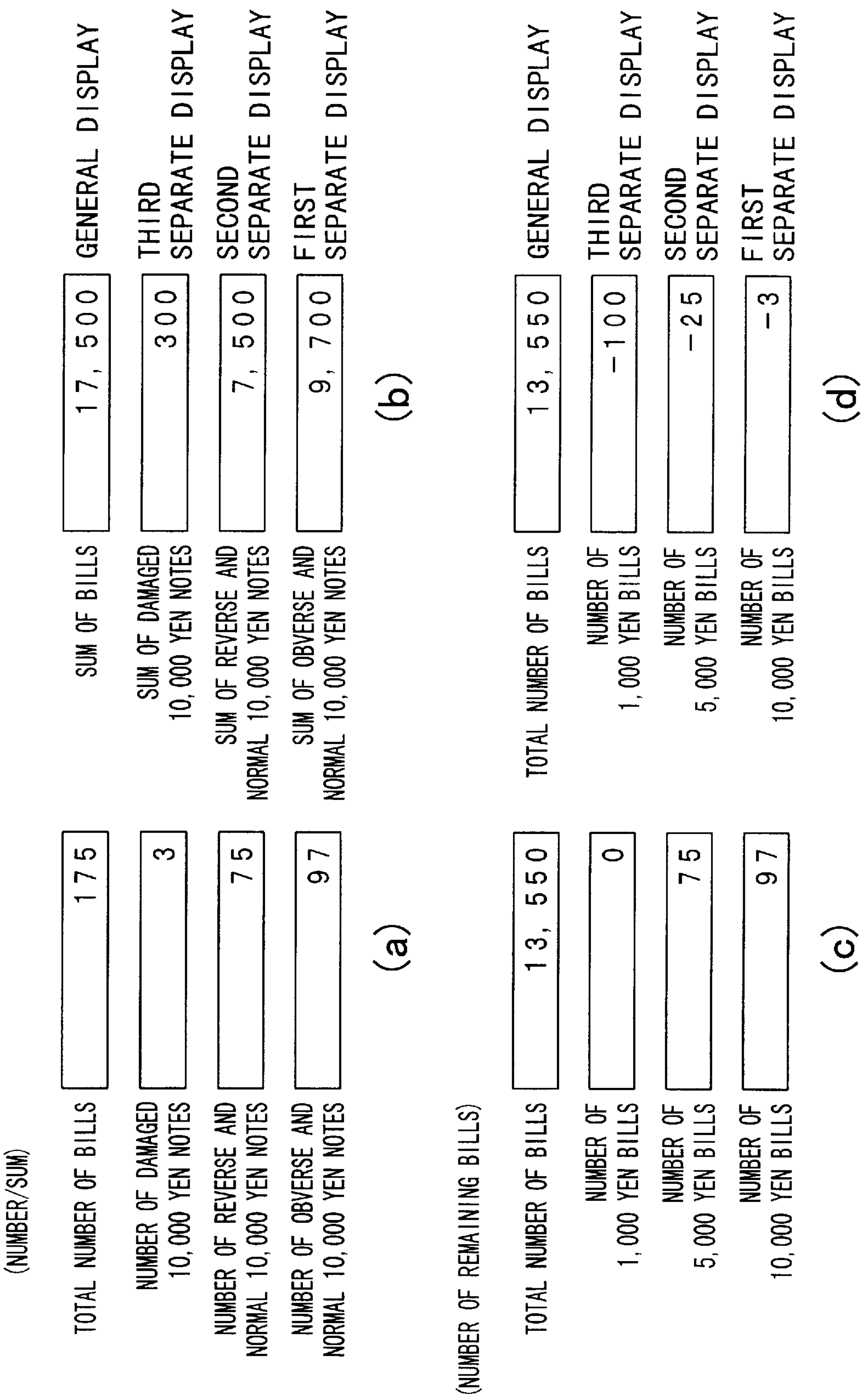
FIGS. 16A to 16D are diagrams showing examples of the displays of an embodiment of the bill arranger of the present invention.

The general display 209, as shown in FIG. 1, is provided at the rear end of the upper face 25 of the machine body 10. The general display 209 can display at least one of the number of or the sum of bills stacked in all the stackers 69 to 71. The general display 209 is used in common for all the stackers 69 to 71, and displays data related to the entire bill arranger. The displayed contents are shown in FIG. 15.

The general display 209 has a guidance display 216, an abnormality lamp 217, a total lamp 218, a number lamp 219, a sum lamp 220, and a digital display 221. The number lamp 219 and the sum lamp 220 are called a general number/sum lamps 222.

The guidance display 216 is provided at the left end of the general display 209. The guidance display 216 shows a schematic layout of the bill arranger. In the schematic layout, LEDs 223 are provided corresponding to the parts of the bill arranger. The LEDs 223 can be turned on or off.

The full-state detecting sensor 114 detects that one of the stackers 69 to 71 and the rejecter 72 is full of stacked bills. At that time, the controller 17 judges that this condition is abnormal, and turns on the LED 223 corresponding to the abnormal point of the guidance display 16.

Further, when the bill detecting sensor 64 of the conveyer 12 detects the abnormal conveyance, the controller 17 judges the abnormal condition, and turns on the LED 223 corresponding to the abnormal point of the guidance display 16.

Moreover, when in the batch process the controller 17 detects that in one of the stackers 69 to 71 the stacked bills reach the batch number, the controller 17 turns on the corresponding LED 223 of the guidance display 216.

The abnormal lamp 217 is provided at the upper right of the guidance display 216. The abnormal lamp 217 has the character "ABNORMAL" which means an abnormal condition, and a back light with an LED behind the character "ABNORMAL." This back light can be turned on or off.

When the full-state detecting sensor 114 detects that one of the stackers 69 to 71 and the rejecter 72 is full of stacked bills, the controller 17 judges that it is in the abnormal condition, and turns on the abnormal lamp 217.

Further, when the bill detecting sensor 64 of the conveyer 12 detects the abnormal conveyance, the controller 17 judges that it is the abnormal condition, and turns on the abnormal lamp 217.

The total lamp 218 is provided below the abnormal lamp 217. The total lamp 218 has the character "TOTAL", and a back light of an LED behind the character "TOTAL." The character "TOTAL" means that the total sum or the total number of bills is displayed on the digital display 221. The back light can be turned on or off.

The number lamp 219 is provided at the right side of the abnormal lamp 217. The number lamp 219 has the character "NUMBER" which means the number of notes, and a back light of an LED behind the character "NUMBER." The back light can be turned on or off.

The sum lamp 220 is provided at the right side of the total lamp 218. The total lamp 220 has the character "SUM" which means the sum of money, and a back light of an LED behind the character "SUM." The back light can be turned on or off.

The digital display 221 is provided in the right side of the number lamp 219 and the sum lamp 220, and comprises LEDs which can display a number of eight figures.

The first separate display 210, as shown in FIG. 1, is provided at the protruding member 106 of the first stacker 69. That is, the second separate display 211 is provided just behind the output opening 110 and the shutter 118 of the first stacker 69. The first separate display 210 can display data related to the first stacker 69. The data is, e.g., at least one of the number and the sum of bills stacked in the first stacker 69.

The second separate display 211 is provided at the protruding member 106 of the second stacker 70. That is, the first separate display 210 is provided just behind the output opening 110 and the shutter 118 of the second stacker 70. The second separate display 211 can display data related to the second stacker 70. The data is, e.g., at least one of the number and the sum of bills stacked in the second stacker 70.

The third separate display 212 is provided at the protruding member 106 of the third stacker 71. That is, the third separate display 212 is provided just behind the output opening 110 and the shutter 118 of the third stacker 71. The third separate display 212 can display data related to the third stacker 71. The data is, e.g., the number or the sum of bills stacked in the third stacker 71.

That is, the respective stackers 69 to 71 have the separate displays 210 to 212.

Figure 14:
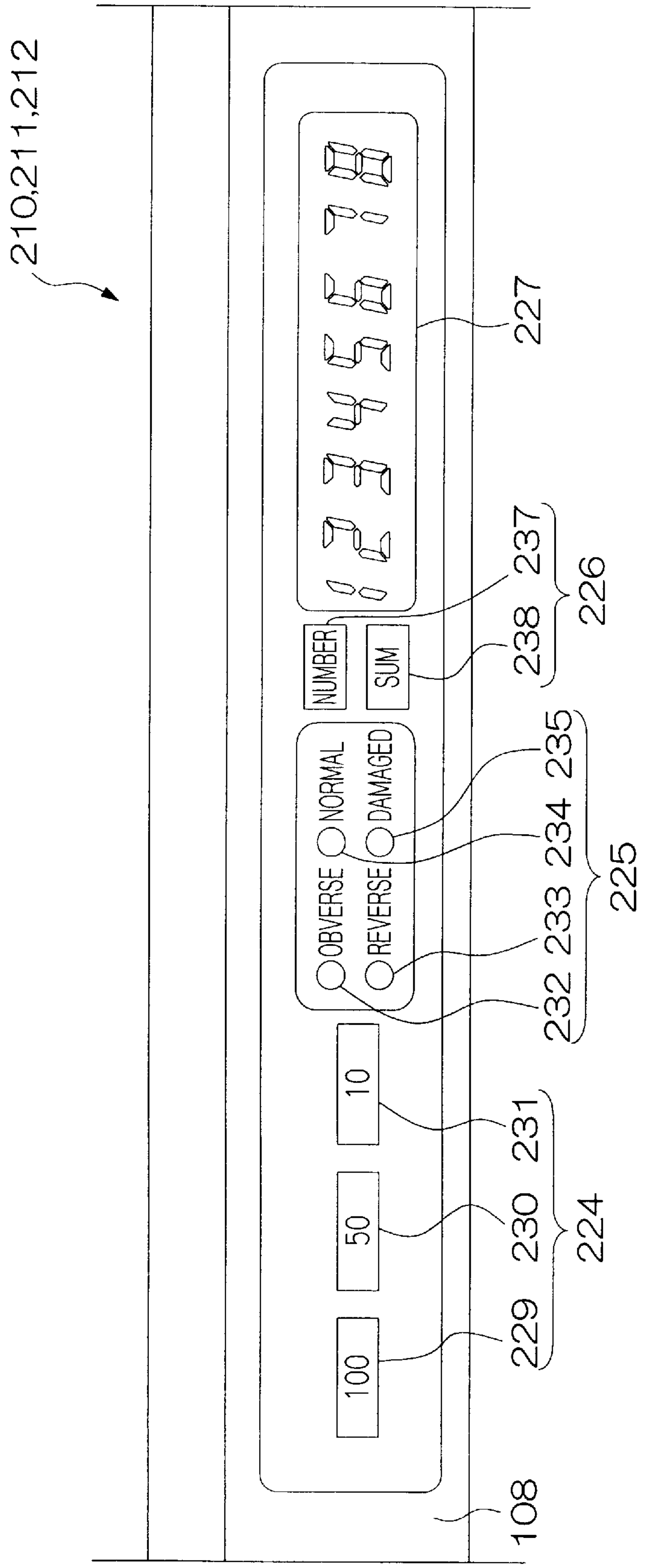
FIG. 14 is a front view showing a separate display of an embodiment of the bill arranger of the present invention.

Each of the first separate display 210, the second separate display 211, and the third separate display 212 has denomination lamps 224, content lamps 225, a number/sum lamps 226, and a digital display 227 as shown in FIG. 14.

The denomination lamps 224 are a 100 lamp 229, a 50 lamp 230, and a 10 lamp 231.

The content lamps 225 are an obverse lamp 232, a reverse lamp 233, a normal lamp 234, and a damage lamp 235.

The number/sum lamps 226 are a number lamp 237 and a sum lamp 238.

The 100 lamp 229 has the figure "100" indicating the denomination A, and a back light of an LED behind the figure "100." The back light can be turned on or off.

The 50 lamp 230 is provided at the right side of the 100 lamp 229. The 50 lamp 230 has the figure "50" indicating the denomination B, and a back light of an LED behind the figure "50." The back light can be turned on or off.

The 10 lamp 231 is provided at the right side of the 50 lamp 230. The 10 lamp 231 has the figure "10" indicating the denomination C, and a back light of an LED behind the figure "10." The back light can be turned on or off.

The obverse lamp 232 is an LED provided at the upper right side of the 10 lamp 231, and can be turned on or off. To the right side of the obverse lamp 232, the character "OBVERSE" which means the obverse note is indicated.

The reverse lamp 233 is an LED provided below the obverse lamp 232, and can be turned on or off. To the right side of the reverse lamp 233, the character "REVERSE" which means the reverse note is indicated.

The normal lamp 234 is an LED provided to the right side of the character "OBVERSE", and can be turned on or off. To the right side of the normal lamp 234, the character "NORMAL" which means the normal note is indicated.

The damage lamp 235 is an LED provided below the normal lamp 234, and can be turned on or off. To the right side of the damage lamp 235, the character "DAMAGED" which means the damaged note is indicated.

The number lamp 237 is provided to the right side of the character "NORMAL". The number lamp 237 has the character "NUMBER" which means the number of notes, and a back light of an LED behind the character "NUMBER." The back light can be turned on or off.

The sum lamp 238 is provided to the right side of the character "DAMAGE". The sum lamp 238 has the character "SUM" which means the sum of money, and a back light of an LED behind the character "SUM." The back light can be turned on or off.

The digital display 227 is provided to the right side of the number lamp 237 and the sum lamp 238, and has LEDs which can display a number of eight figures.

The reject indicating lamp 213, as shown in FIG. 1, has an LED provided at the protruding member 172 of the rejecter 72. The reject display lamp 213 is provided just behind the reject opening 175 and the lid 177 of the rejecter 72. When the remaining bill detecting sensor 111 of the rejecter 72 detects a bill, the controller 17 turns on the reject indicating lamp 213. When the remaining bill detecting sensor 111 of the rejecter 72 does not detects a bill, the controller 17 turns off the reject indicating lamp 213.

The priority indicating lamps 214 are LEDs just behind the start/stop keys 184. The left priority indicating lamp 214 is turned on when the left start/stop key 184 occupies the bill arranger. The right priority indicating lamp 214 is turned on when the right start/stop key 184 occupies the bill arranger.

Next, the setting process of the bill arranger will now be explained.

Function Setting

When setting the function, the information required for the setting operation is displayed on the function display 208 shown in FIG. 10. The operator confirms the displayed contents, and sets the function.

The operation and the contents displayed on the function display 208 for the function setting will be explained.

Initially, the operator turns on the main switch 27, and then the controller 17 displays the contents shown in FIG. 10 on the function display 208.

That is, the controller 17 displays a date in the upper left area, and a time in the upper right area on the function display 208. The controller 17 displays the batch number for the batch process stored in the memory (e.g., 100) in the lower left area on the function display 208. Further, the controller 17 displays the character "UF", which means the discrimination level for a damaged bill, and the current discrimination level stored in the memory (e.g., "H"), in the lower middle area on the function display 208. Further, the controller 17 displays the character "UV", which means the UV detection level, and the current UV detection level stored in the memory (e.g., "H"), in the lower right area on the function display 208.

When a predetermined time has passed after the main switch 27 is turned on, the controller 17 controls the bill arranger to enter the standby state, and displays the contents shown in FIG. 12A on the function display 208. That is, the controller 17 displays the character "OP." which means the operator number, and the operator number which is stored in the memory at that time (e.g., 123), instead of the date in the upper area.

When the bill arranger enters the standby state after the completion of the process, the controller 17 displays the contents of the initial state shown in FIG. 12A on the function display.

Only in the standby state, is the sorting setting, which is described later, possible.

Further, only in the standby state, is the sorting process for the bills loaded in the loader 11 executable. By pushing the start/stop key 184, the controller 17 executes the sorting process according to the present function setting and of the present sorting setting.

In the initial state, the operator pushes the ENT key 205. Then, the controller 17 displays the contents shown in FIG. 12B on the function display 208. That is, the value of the operator number in the contents shown in FIG. 12A is blank. Then, the operator inputs the operator number through the ten keys 199. The controller 17 then displays the number input from the ten keys 199 in the blank.

When the value is input from the ten keys 199 and the ENT key 205 is pushed, the controller stores the input operator number into the memory. Then, the controller 17 displays the contents shown in FIG. 12C on the function display 208. The controller 17 displays the character "BATCH" which means the batch number, and the batch number stored in the memory (e.g., "100") on the function display 208.

When the value input by the ten keys 199 is an error, the input value can be deleted by pushing the CE key 204.

When the function display 208 displays the contents shown in FIG. 12C and the operator pushes the set key 202, the controller 17 displays the contents shown in FIG. 12D. That is, the controller 17 displays the mark "→", which means "change", to the right side of the batch number (e.g., "100"), and the right space of the mark becomes blank. Then, the operator inputs the batch number by the ten keys 199. The controller 17 displays the value input by the ten keys 199 in the blank space. The operator re-inputs the value by the ten keys 199, and pushes the ENT key 205. Then, the controller 17 updates the batch number stored in the memory to the re-input value. Simultaneously, the controller 17 displays the contents shown in FIG. 12C on the function display 208. At that time, the controller 17 displays the value newly stored in the memory as the batch number.

When the ENT key 205 is pushed while the contents shown in FIG. 12C are displayed, the controller 17 then displays the contents shown in FIG. 12E. That is, the controller 17 displays the character "UF" which means the discrimination level for a damaged note, and the character which represents the present discrimination level stored in the memory (e.g., "H"), at the upper left in the function display 208. Further, the controller 17 displays the numeral "100" which means the denomination A, the character "D" which means the discrimination level for dirtied bills, the present discrimination level value for the dirtied bills of the denomination A stored in the memory (e.g., "8"), the character "T" which means the discrimination level for worn bills, and the present discrimination level value for the worn bills of the denomination A stored in the memory (e.g., "8"), at the upper right in the function display 208. Further, the controller 17 displays the numeral "50" which means the denomination B, the character "D" which means the discrimination level for dirtied bills, the present discrimination level value for dirtied bills of the denomination B stored in the memory (e.g., "8"), the character "T" which means the discrimination level for worn bills, and the present discrimination level value for worn bills of the denomination B stored in the memory (e.g., "8"), at the lower left in the function display 208. Moreover, the controller 17 displays the numeral "10" which means the denomination C, the character "D" which means the discrimination level for dirtied bills of the denomination C, the present discrimination level value for dirtied bills of the denomination C stored in the memory (e.g., "8"), the character "T" which means the discrimination level for worn bills, and the present discrimination level value for worn bills of the denomination C stored in the memory (e.g., "8"), at the lower right in the function display 208. Here, the discrimination level is indicated by a value of 1 to 10.

In this situation, to change the discrimination level for damaged notes, the operator pushes the set key 202. The controller 17 then displays the contents shown in FIG. 12F on the function display 208. That is, the discrimination level value for the denomination A in the contents shown in FIG. 12E is blank. The blank space can be moved, depending on the number of pushes on the set key 202. When a desired field is blank, the operator inputs a value with the ten keys 199. The controller 17 then displays the value input by the ten keys 199 in the blank space. The operator re-inputs the value by the ten keys 199, and pushes the ENT key 205. Then, the controller 17 updates the discrimination level value stored in the memory to the re-input value. Simultaneously, the controller 17 displays the contents shown in FIG. 12E on the function display 208. At that time, the controller 17 displays the value newly stored in the memory as the discrimination level value. Based on the values, the characters H—L which represent the discrimination level stored in the memory are switched if necessary.

When the ENT key 205 is pushed while the contents shown in FIG. 12E are displayed, the controller 17 then displays the contents shown in FIG. 12G. That is, the controller 17 displays the character "UV" which means the UV detection level, and the character which represents the present UV detection level stored in the memory (e.g., "H"), at the upper left in the function display 208. Further, the controller 17 displays the numeral "100" which means the denomination A, and the present UV detection level value for the denomination A stored in the memory (e.g., "8"), at the upper right in the function display 208. Further, the controller 17 displays the numeral "50" which means the denomination B, and the present UV detection level value for the denomination B stored in the memory (e.g., "8"), at the lower left in the function display 208. Moreover, the controller 17 displays the numeral "10" which means the denomination C, and the present UV detection level value for the denomination C stored in the memory (e.g., "8"), at the lower right in the function display 208. Here, the UV detection level is indicated by a value of 1 to 10.

In this situation, to change the UV detection level, the operator pushes the set key 202. The controller 17 then displays the contents shown in FIG. 12H on the function display 208. That is, the UV detection level value for the denomination A in the contents shown in FIG. 12G is blank. The blank space can be moved, depending on the number of pushes on the set key 202. When a desired field is blank, the operator inputs a value by the ten keys 199. The controller 17 then displays the value input by the ten keys 199 in the blank space. The operator re-inputs the value by the ten keys 199, and pushes the ENT key 205. Then, the controller 17 updates the UV detection level value stored in the memory to the re-input value. Simultaneously, the controller 17 displays the contents shown in FIG. 12G on the function display 208. At that time, the controller 17 displays the value newly stored in the memory as the UV detection level value.

When the ENT key 205 is pushed while the contents shown in FIG. 12G is displayed, the controller 17 displays the contents shown in FIG. 12A on the function display 208, at which point the function setting is completed.

Setting Sorting Process Mode

The setting of the sorting process mode is performed in the standby state in which the function setting is not performed. The controller 17 displays necessary information on the general display 209 and the separate displays 210 to 212 according to the operation for setting the sorting process mode. That is, the controller 17 displays the setting in regard to the entire bill arranger on the general display 209. The controller 17 displays the setting for the first stacker 69 on the first separate display 210. Further, the controller 17 displays the setting for the second stacker 70 on the second separate display 211. Moreover, the controller 17 displays the setting for the third stacker 71 on the third separate display 212. The operator can confirm the displayed contents, and performs the setting. The controller 17 displays the contents of the setting at each stage on the general display 209 and the separate displays 210 to 212.

The setting of the sorting process mode is performed by the batch key 188, the obverse/reverse key 189, the normal/damaged key 190, the UV key 191, the 100 key 192, the 50 key 193, the 10 key 194, and the set key 202. When setting the sorting process, one of a plurality of the sorting settings, which are shown in the list of FIG. 13, is selected. The six keys, which are the obverse/reverse key 189, the normal/damaged key 190, the UV key 191, the 100 key 192, the 50 key 193, and the 10 key 194, are referred to as setting keys 240.

In FIG. 13, the processes marked with ○ can be combined with the batch process. When an input is received from the batch key 188, the controller selects the sorting process mode, and combines it with the batch process if the combination is possible.

When the batch process is combined, the controller 17 performs the following process. When in the sorting process the bills stacked in at least one of the stackers 69 to 71 reach the batch number, the controller 17 interrupts the sorting process. When the remaining bill detecting sensor 111 detects that the stacked bills S, which have reached the batch number, are removed, the sorting process is restarted.

Alternatively, the controller 17 performs the following process. When in the sorting process the bills stacked in at least one of the stackers 69 to 71 reach the batch number, and when there is another stacker for stacking the same bills, the following bills are stacked in this stacker.

The setting of the sorting process mode will now be explained with reference to FIG. 13.

FIG. 13 shows an example of the bill arranger used in Japan. In FIG. 13, the denomination A is 10,000-yen bills which are represented by "100." The denomination B is 5,000-yen bills which are represented by "50." The denomination C is 1,000-yen bills which are represented by "10."

A denomination sorting mode is selected from the settings 1 to 4. In the denomination sorting mode, the stackers 69 to 71 stack different denominations of bills.

{Setting 1}

According to the setting 1, the first stacker 69 stacks true bills of the denomination A, the second stacker 70 stacks the true bills of the denomination B, the third stacker stacks the true bills of the denomination C, and the rejecter stacks the other bills. The bills stacked in the rejecter 72 are false. When no input is received from the setting keys 240, the controller 17 selects the setting 1 for the sorting process mode.

When the setting 1 is selected for the sorting process mode, the controller 17 turns on only the 100 lamp 229 of the denomination lamps 224 in the first separate display 210, and turns off the other content lamps 225 in the first separate display 210. In the second separate display 211, the controller 17 turns on only the 50 lamp 230 of the denomination lamps 224, and turns off the other content lamps 225. In the third separate display 212, the controller 17 turns on only the 10 lamp 231 of the denomination lamps 224, and turns off the other content lamps 225.

When, in the sorting process mode according to the setting 1, an input is received from the batch key 188, the controller 17 additionally lights the batch key 188, and selects the sorting process mode of the setting 1 combined with the batch process. According to this setting, the batch process is performed by all the stackers 69 to 71.

{Setting 2}

According to the setting 2, the first stacker 69 stacks true and obverse bills of the denomination A, the second stacker 70 stacks true and obverse bills of the denomination B, the third stacker 71 stacks true and obverse bills of the denomination C, and the rejecter 72 stacks the other bills. The bills stacked in the rejecter 72 are false bills, and reverse bills of the denominations A, B, and C. When receiving an input only from the obverse/reverse key 189 of the setting keys 240, the controller 17 selects the setting 2 for the sorting process mode.

When the setting 2 is selected for the sorting process mode, the controller 17 turns on only the 100 lamp 229 of the denomination lamps 224 and the obverse lamp 232 of the content lamps 225 in the first separate display 210. In the second separate display 211, the controller 17 turns on only the 50 lamp 230 of the denomination lamps 224 and the obverse lamp 232 of the content lamp 225. In the third separate display 212, the controller 17 turns on only the 10 lamp 231 of the denomination lamps 224 and the obverse lamp 232 of the content lamps 225.

When, in the sorting process mode according to the setting 2, an input is received from the batch key 188, the controller 17 additionally lights the batch key 188, and selects the sorting process mode of the setting 2 combined with the batch process. According to this setting, the batch process is performed by all the stackers 69 to 71.

{Setting 3}

According to the setting 3, the first stacker 69 stacks true and normal bills of the denomination A, the second stacker 70 stacks true and normal bills of the denomination B, the third stacker 71 stacks the true and normal bills of the denomination C, and the rejecter 72 stacks the other bills. The bills stacked in the rejecter 72 are false bills, and damaged bills of the denominations A, B, and C. When receiving an input only from the normal/damaged key 190 of the setting keys 240, the controller 17 selects the setting 3 for the sorting process mode.

When the setting 3 is selected for the sorting process mode, the controller 17 turns on only the 100 lamp 229 of the denomination lamps 224 and the normal lamp 234 of the content lamps 225 in the first separate display 210. In the second separate display 211, the controller 17 turns on only the 50 lamp 230 of the denomination lamps 224 and the normal lamp 234 of the content lamps 225. In the third separate display 212, the controller 17 turns on only the 10 lamp 231 of the denomination lamps 224 and the normal lamp 234 of the content lamps 225.

When, in the sorting process mode according to the setting 3, an input is received from the batch key 188, the controller 17 additionally lights the batch key 188, and selects the sorting process mode of the setting 3 combined with the batch process. According to this setting, the batch process is performed by all the stackers 69 to 71.

{Setting 4}

According to the setting 4, the first stacker 69 stacks true, normal, and obverse bills of the denomination A, the second stacker 70 stacks true, normal, and obverse bills of the denomination B, the third stacker 71 stacks true, normal, and obverse bills of the denomination C, and the rejecter 72 stacks the other bills. The bills stacked in the rejecter 72 are false bills, reverse bills of the denominations A, B, and C, and damaged bills of the denomination A, B, and C. When receiving inputs only from the obverse/reverse key 189 and the normal/damaged key 190 of the setting keys 240, the controller 17 selects the setting 4 for the sorting process mode.

When the setting 4 is selected for the sorting process mode, the controller 17 turns on only the 100 lamp 229 of the denomination lamps 224, and the obverse lamp 232 and the normal lamp 234 of the content lamps 225 in the first separate display 210. In the second separate display 211, the controller 17 turns on only the 50 lamp 230 of the denomination lamps 224, and the obverse lamp 232 and the normal lamp 234 of the content lamps 225. In the third separate display 212, the controller 17 turns on only the 10 lamp 231 of the denomination lamps 224, and the obverse lamp 232 and the normal lamp 234 of the content lamps 225.

When, in the sorting process mode according to the setting 4, an input is received from the batch key 188, the controller 17 additionally lights the batch key 188, and selects the sorting process mode of the setting 4 combined with the batch process. According to this setting, the batch process is performed by all the stackers 69 to 71.

A designated denomination sorting mode is selected from the settings 5 to 22. The designated denomination sorting means separating bills of a specified denomination. In the designated denomination sorting mode, the settings 5 to 10 are applied for the denomination A, the settings 11 to 16 are applied for the denomination B, and the settings 17 to 22 are applied for the denomination C.

{Setting 5}

According to the setting 5, the first stacker 69, the second stacker 70, and the third stacker 71 successively stack true bills of the denomination A, and the rejecter stacks the other bills. The bills stacked in the rejecter 72 are false bills, and true bills other than the denomination A. When receiving an input only from the 100 key 192, the controller 17 selects the setting 5 for the sorting process mode.

When the setting 5 is selected for the sorting process mode, the controller 17 turns on only the 100 lamps 229 of the denomination lamps 224 in the first to third separate displays 210 to 212, and turns off the other content lamps 225.

When, in the sorting process mode according to the setting 5, an input is received from the batch key 188, the controller 17 additionally lights the batch key 188, and selects the sorting process mode of the setting 5 combined with the batch process. According to this setting, the batch process is performed by all the stackers 69 to 71.

{Setting 6}

According to the setting 6, the first stacker 69 stacks true and obverse bills of the denomination A, the second stacker 70 stacks true and obverse bills of the denomination A, the third stacker 71 stacks true and reverse bills of the denomination A, and the rejecter 72 stacks the other bills. The bills stacked in the rejecter 72 are false bills, and bills other than the denominations A. When receiving inputs only from the 100 key 192 and the obverse/reverse key 189 of the setting keys 240, the controller 17 selects the setting 6 for the sorting process mode.

When the setting 6 is selected for the sorting process mode, the controller 17 turns on only the 100 lamp 229 of the denomination lamps 224 and the obverse lamp 232 of the content lamps 225 in the first separate display 210. In the second separate display 211, the controller 17 turns on only the 100 lamp 229 of the denomination lamps 224 and the obverse lamp 232 of the content lamps 225. In the third separate display 212, the controller 17 turns on only the 100 lamp 229 of the denomination lamps 224 and the reverse lamp 233 of the content lamps 225.

When, in the sorting process mode according to the setting 6, an input is received from the batch key 188, the controller 17 additionally lights the batch key 188, and selects the sorting process mode of the setting 6 combined with the batch process. According to this setting, the batch process is performed by all the stackers 69 to 71.

{Setting 7}

According to the setting 7, the first stacker 69 stacks true and normal bills of the denomination A, the second stacker 70 stacks true and normal bills of the denomination A, the third stacker 71 stacks true and damaged bills of the denomination A, and the rejecter 72 stacks the other bills. The bills stacked in the rejecter 72 are false bills, and bills other than the denomination A. When receiving inputs only from the 100 key 192 and the normal/damaged key 190 of the setting keys 240, the controller 17 selects the setting 7 for the sorting process mode.

When the setting 7 is selected for the sorting process mode, the controller 17 turns on only the 100 lamp 229 of the denomination lamps 224 and the normal lamp 234 of the content lamps 225 in the first separate display 210. In the second separate display 211, the controller 17 turns on only the 100 lamp 229 of the denomination lamps 224 and the normal lamp 234 of the content lamps 225. In the third separate display 212, the controller 17 turns on only the 100 lamp 229 of the denomination lamps 224 and the damage lamp 235 of the content lamp 235.

When, in the sorting process mode according to the setting 7, an input is received from the batch key 188, the controller 17 additionally lights the batch key 188, and selects the sorting process mode of the setting 7 combined with the batch process. According to this setting, the batch process is performed only by the stackers 69 and 70.

{Setting 8}

According to the setting 8, the first stacker 69 stacks true, obverse, and normal bills of the denomination A, the second stacker 70 stacks true, reverse, and normal bills of the denomination A, the third stacker 71 stacks true and damaged bills of the denomination A, and the rejecter 72 stacks the other bills. The bills stacked in the rejecter 72 are false bills, and bills other than the denomination A. When receiving an input only from the 100 key 192, the obverse/reverse key 189, and the normal/damaged key 190 of the setting keys 240, the controller 17 selects the setting 8 for the sorting process mode.

When the setting 8 is selected for the sorting process mode, the controller 17 turns on only the 100 lamp 229 of the denomination lamps 224, and the obverse lamp 232 and the normal lamp 234 of the content lamps 225 in the first separate display 210. In the second separate display 211, the controller 17 turns on only the 100 lamp 229 of the denomination lamps 224, and the reverse lamp 233 and the normal lamp 234 of the content lamps 225. In the third separate display 212, the controller 17 turns on only the 100 lamp 229 of the denomination lamps 224 and the damage lamp 235 of the content lamps 225.

When, in the sorting process mode according to the setting 8, an input is received from the batch key 188, the controller 17 additionally lights the batch key 188, and selects the sorting process mode of the setting 8 combined with the batch process. According to this setting, the batch process is performed only by the stackers 69 and 70.

{Setting 9}

According to the setting 9, the first stacker 69 stacks true, obverse, and upward bills of the denomination A, the second stacker 70 stacks true, obverse, and inverted bills of the denomination A, the third stacker 71 stacks true and reverse bills of the denomination A, and the rejecter 72 stacks the other bills. The bills stacked in the rejecter 72 are false bills, and bills other than the denomination A. When receiving inputs only from the 100 key 192, the obverse/reverse key 189, and the UV key 191 of the setting keys 240, the controller 17 selects the setting 9 for the sorting process mode.

When the setting 9 is selected for the sorting process mode, the controller 17 turns on only the 100 lamp 229 of the denomination lamps 224, and the obverse lamp 232 of the content lamps 225 in the first separate display 210. In the second separate display 211, the controller 17 turns on only the 100 lamp 229 of the denomination lamps 224, and the obverse lamp 232 of the content lamps 225. In the third separate display 212, the controller 17 turns on only the 100 lamp 229 of the denomination lamps 224, and the reverse lamp 233 of the content lamps 225.

When, in the sorting process mode according to the setting 9, an input is received from the batch key 188, the controller 17 additionally lights the batch key 188, and selects the sorting process mode of the setting 9 combined with the batch process. According to this setting, the batch process is performed only by the stackers 69 and 70.

{Setting 10}

According to the setting 10, the fist stacker 69 stacks true and normal bills of the denomination A, the second stacker 70 stacks true and damaged bills of the denomination A, the third stacker 71 stacks false bills, and the rejecter 72 stacks the other bills. The bills stacked in the rejecter 72 are bills other than the denomination A. When receiving inputs only from the 100 key 192, the normal/damaged key 190, and the UV key 191 of the setting keys 240, the controller 17 selects the setting 10 for the sorting process mode.

When the setting 10 is selected for the sorting process mode, the controller 17 turns on only the 100 lamp 229 of the denomination lamps 224, and the normal lamp 234 of the content lamps 225 in the first separate display 210. In the second separate display 211, the controller 17 turns on only the 100 lamp 229 of the denomination lamps 224, and the damage lamp 235 of the content lamps 225. In the third separate display 212, the controller 17 turns on only the 100 lamp 229 of the denomination lamps 224, and turns off all the content lamps 225.

When, in the sorting process mode according to the setting 10, an input is received from the batch key 188, the controller 17 additionally lights the batch key 188, and selects the sorting process mode of the setting 10 combined with the batch process. According to this setting, the batch process is performed only by the stacker 69.

{Setting 11}

The setting 11 is similar to the setting 5, except that the denomination A in the setting 5 is substituted for the denomination B, the 100 key 192 in the setting 5 is substituted for the 50 key 193, and the 100 lamp 229 in the setting 5 is substituted for the 50 lamp 230.

{Setting 12}

The setting 12 is similar to the setting 6, except that the denomination A in the setting 6 is substituted for the denomination B, the 100 key 192 in the setting 6 is substituted for the 50 key 193, and the 100 lamp 229 in the setting 6 is substituted for the 50 lamp 230.

{Setting 13}

The setting 13 is similar to the setting 7, except that the denomination A in the setting 7 is substituted for the denomination B, the 100 key 192 in the setting 7 is substituted for the 50 key 193, and the 100 lamp 229 in the setting 7 is substituted for the 50 lamp 230.

{Setting 14}

The setting 14 is similar to the setting 8, except that the denomination A in the setting 8 is substituted for the denomination B, the 100 key 192 in the setting 8 is substituted for the 50 key 193, and the 100 lamp 229 in the setting 8 is substituted for the 50 lamp 230.

{Setting 15}

The setting 15 is similar to the setting 9, except that the denomination A in the setting 9 is substituted for the denomination B, the 100 key 192 in the setting 9 is substituted for the 50 key 193, and the 100 lamp 229 in the setting 9 is substituted for the 50 lamp 230.

{Setting 16}

The setting 16 is similar to the setting 10, except that the denomination A in the setting 10 is substituted for the denomination B, the 100 key 192 in the setting 10 is substituted for the 50 key 193, and the 100 lamp 229 in the setting 10 is substituted for the 50 lamp 230.

{Setting 17}

The setting 17 is similar to the setting 5, except that the denomination A in the setting 5 is substituted for the denomination C, the 100 key 192 in the setting 5 is substituted for the 10 key 194, and the 100 lamp 229 in the setting 5 is substituted for the 10 lamp 231.

{Setting 18}

The setting 18 is similar to the setting 6, except that the denomination A in the setting 6 is substituted for the denomination C, the 100 key 192 in the setting 6 is substituted for the 10 key 194, and the 100 lamp 229 in the setting 6 is substituted for the 10 lamp 231.

{Setting 19}

The setting 19 is similar to the setting 7, except that the denomination A in the setting 7 is substituted for the denomination C, the 100 key 192 in the setting 7 is substituted for the 10 key 194, and the 100 lamp 229 in the setting 7 is substituted for the 10 lamp 231.

{Setting 20}

The setting 20 is similar to the setting 8, except that the denomination A in the setting 8 is substituted for the denomination C, the 100 key 192 in the setting 8 is substituted for the 10 key 194, and the 100 lamp 229 in the setting 8 is substituted for the 10 lamp 231.

{Setting 21}

The setting 21 is similar to the setting 9, except that the denomination A in the setting 9 is substituted for the denomination C, the 100 key 192 in the setting 9 is substituted for the 10 key 194, and the 100 lamp 229 in the setting 9 is substituted for the 10 lamp 231.

{Setting 22}

The setting 22 is similar to the setting 10, except that the denomination A in the setting 5 is substituted for the denomination C, the 100 key 192 in the setting 10 is substituted for the 10 key 194, and the 100 lamp 229 in the setting 10 is substituted for the 10 lamp 231.

As a true/false bill sorting process, the setting 23 can be selected. In the true/false bill sorting process, the bills are divided into true bills and false bills, and only the true bills are counted.

{Setting 23}

According to the setting 23, the stackers 69 to 71 successively stack the true bills, and the rejecter 72 stack false bills. When receiving an input only from the UV key 191 of the setting keys 240, the controller 17 selects the setting 23 for the sorting process.

When the setting 23 is selected for the sorting process mode, the controller 17 turns off all the denomination lamps 224 and the content lamps 225 in the first to third separate displays 210 to 212.

There is no sorting process mode in which the setting 23 is combined with the batch process.

In the settings 1 to 23, when receiving an input from the number/sum key 200, the controller 17 turns on the number lamps 237 of the number/sum lamps 226 in the separate displays 210 to 212. When one of the settings 5 to 23 is selected for the designated denomination sorting process, the controller 17 turns on only the number lamp 219 of the general number/sum lamps 222 in the general display 209 because it is important to display the sum. When one of the settings 1 to 4 is selected for the denomination sorting process, the controller 17 automatically turns on the sum lamp 220 of the general number/sum lamps 222 in the general display 209 because it is not important to display the sum.

In the settings 1 to 23, when receiving no input from the number/sum key 200, the controller 17 turns on only the sum lamps 237 of the number/sum lamps 226 in the separate displays 210 to 212. Further, the controller 17 turns on only the sum lamp 220 of the general number/sum lamps 222 in the general display 209.

Therefore, the general display 209 can display which number or sum is selected.

In the settings 1 to 23, when receiving an input from the total key 201, the controller 17 turns on only the total lamps 218 in the general display 209. When receiving no input from the total key 201, the controller 17 turns off the total lamp 218 in the general display 209.

As described above, one of the sorting process modes is selected by the operating device 15. Then, according to the selected sorting process mode, the controller 17 displays the contents of the bills sorted in the first stacker 69 on the first separate display 210, displays the contents of the bills sorted in the second stacker 70 on the second separate display 211, and displays the contents of the bills sorted in the third stacker 71 on the third separate display 212.

Next, the operation of the bill arranger will now be explained.

First, the operation will now be explained when one of the sorting process modes is selected by the operating device 15, and the selected sorting process mode cannot be combined with the batch process.

When the start/stop key 184 is pushed, the controller 17 starts one sorting process. The controller 17 memorizes the priority of the pushed start/stop key 184, and turns on the priority indicating lamp 214 corresponding to the pushed start/stop key 184. Simultaneously, in response to the detection of the bills by the bill detecting sensor 44 of the loader 11, the controller 17 turns on all the clutches 123 of the stackers 69 to 71. Thus, all the closed shutters 118 of the stackers 69 to 71 are fixed, and the operator cannot manually open them. In this situation, the controller 17 then starts the selected sorting process.

Initially, the controller 17 starts driving the loader 11 and the conveyer 12 by the conveyer drive motor 40. The bills are loaded one by one from the loader 11. The controller 17 discriminates and counts the bills, which were loaded from the loader 11, by the first and second discriminating units 66 and 67 of the discriminating device 13. The controller 17 controls the sorters 58 to 60 to deliver the bills to one of the stackers 69 to 71 or to the rejecter 72. In this process, based on the discrimination results obtained by the discriminating device 13, the bills are delivered to the positions specified in the sorting process mode. Only when the bill is conveyed to the rejecter 72 and the remaining bill detecting sensor 111 of the rejecter 72 detects the bill, the controller 17 turns on the reject indicating lamp 213.

As shown in FIG. 4, when in the stackers 69 to 71 no bill is placed on the guide plates 145, the lower ends of the guide plates 145 are positioned above and behind the lower end of the front plate 82 by the biasing force of the spring 148. As the result, the guide plates 145 minimize the capacity of the stacking space 109. The releasing mechanism 75 delivers the bill into the stacking space 109, and pushes down the bill by the impeller 102 onto the front plate 82. Thus, the bill is placed on the guide plates 145.

As the bills are successively placed on the guide plates 145, the guide plates 145 are rotated about the bent portion 152 because of the weight of the stacked bills S. As the weight of the stacked bills S increases, the capacity of the stacking space 109 increases.

Finally, based on the detection results from the bill detecting sensors 44 and 64, the controller 17 detects that all the bills in the loader 11 are sent to the stackers 69 to 71 and to the rejecter 72. Then, the controller 17 determines the permission of removing the bills from the stackers 69 and 71. The operator pushes the start/stop key 184, which has occupied the operation, to open the shutters 118. The controller 17 then drives all the shutter drive motors 131 of the stackers 69 to 71 to open the shutters 118. The shutter drive motors 131 are driven until the opened shutter sensor 142 detects the detection portion 121. Thus, the controller 17 opens all the shutters 118.

As shown in FIG. 8, as all the shutters 118 of the stackers 69 to 71 are opened, all the pushers 154 of the stackers 69 to 71 are rotated. The angle between the pusher 154 and the front plate 82 becomes maximized. The bills S stacked in the stackers 69 to 71 change their positions so that their upper portions are moved toward the upper rear. Thus, the operator can remove the stacked bills S through the output openings 110.

The remaining bill detecting sensors 111 of the stackers 69 to 71 detect the removal of the stacked bills S. The controller 17 then drives the shutter drive motors 131 in the reverse direction until the closed shutter sensors 141 detect the detection portions 121. Thus, the controller 17 closes all the shutters 118.

When all the shutters 118 are closed, the controller 17 completes the sorting process. Simultaneously, the controller 17 turns off the priority indicating lamp 214 corresponding to the start/stop key 184 which has occupied the process.

In the sorting process, the bills may be repeatedly or only once loaded in the loader 11. In either case, after the completion of the previous process of delivering all the bills from the loader 11 to the stackers 69 to 71 and to the rejecter 72, removing the bills therefrom, and closing the shutters 118, one sorting process is defined from the push of start/stop key 184 through the delivery of the bills to the stackers 69 to 71 and to the rejecter 72, and the removal of the bills therefrom, to the closing of the shutters 118.

Until all the bills loaded in the loader 11 are delivered to the stackers 69 to 71 and to the rejecter 72, the controller 17 has determined that the removal of the bills from the stackers 69 to 71 should be prohibited. Therefore, the controller 17 controls the shutter drive motors 131 to keep closing all the shutters 118.

Further, when the shutter drive motors 131 keep closing the shutters 118, the clutches 123 fix the gears 124 and the rotational shafts 120. Thus, the operator cannot manually open the shutters 118.

Just before detecting that all the bills loaded in the loader 11 are delivered to the stackers 69 to 71 and to the rejecter 72, the full-state detecting sensor 114 may detect that one of the stackers 69 to 71 and the rejecter 72 is full of bills. The controller 17 then stops the conveyer drive motor 40 to stop driving the loader 11 and the conveyer 12 (this situation is hereinafter referred to as a process interrupted state). Simultaneously, the controller 17 permits the removal of the bills from whichever stackers 69 to 71 and the rejecter 72 is full, and opens the shutter 118 by the shutter drive motor 131. In addition, the controller 17 turns on the abnormal lamp 217 in the general display 209. Further, the controller 17 turns on the LED 223, corresponding to the position where the full-state detecting sensor 114 detects the full state of bills, in the guidance display 216 of the general display 209.

The full-state detecting sensor 114, which detected that one of the stackers 69 to 71 and the rejecter 72 was full of bills, then detects that the stacker or the rejecter is not full of bills. The controller 17 judges that the operator removed the bills, and closes the shutter 118 by driving the shutter drive motor 131. In addition, the controller 17 turns off the abnormal lamp 217 of the general display 209 and the corresponding LED 223 of the guidance display 216. When the start/stop key 184, which has occupied the process, is pushed, the controller 17 restarts driving the loader 11 and the conveyer 12 by driving the conveyer drive motor 40.

When all the bills loaded in the loader 11 are delivered to the stackers 69 to 71 and the rejecter 72, the controller 17 may open all the shutters 118 of the stackers 69 to 71 regardless of the operation to the start/stop key 184 which has occupied the process.

When the start/stop key, which has occupied the process, is pushed during the execution of the sorting process, the controller 17 stops the conveyer drive motor 40 to stop the loader 11 and the conveyer 12 (this situation will be also referred to as a process interrupted state). Then, when the start/stop key 184 is pushed again, the controller 17 restarts driving the loader 11 and the conveyer 12 by driving the conveyer drive motor 40.

Next, the operation will now be explained when one of the sorting process modes is selected by the operating device 15, and the selected sorting process mode is combined with the batch process. In the followings, mainly the differences from the sorting process which cannot be combined with the batch process will be discussed.

The bills are loaded one by one from the loader 11. The controller 17 discriminates and counts the bills, which were loaded from the loader 11, by the discriminating device 13. Based on the discrimination results obtained by the discriminating device 13, the bills are delivered to one of stackers 69 to 71 or to the rejecter specified in the sorting process mode.

When the bills in one of the stackers 69 to 71 reach the batch number, the controller 17 stops the conveyer drive motor 40 to stop the loader 11 and conveyer 12 (this situation is also included in the process interrupted state). Simultaneously, the controller 17 permits the removal of the bills which have reached the batch number in one of stackers 69 to 71 and the rejecter 72, and opens the shutter 118 by the shutter drive motor 131. In addition, the controller 17 turns on the LED 223, corresponding to the position where the bills have reached the batch number, in the guidance display 216 of the general display 209.

In one of the stackers 69 to 71 in which the bills have reached the batch number, when the remaining bill detecting sensor 111 detects no bills, the controller 17 judges that all the bills were removed by the operator. Then, the controller 17 closes the shutter 118 by driving the shutter drive motor 131. When the start/stop key 184, which has occupied the process, is pushed, the controller 17 restarts driving the loader 11 and the conveyer 12.

In the following, the display of the values on the display 16, which is controlled by the controller 17, will be explained.

When number indication is selected through the number/sum key 200 and subtotal indication is selected through the total key 201, the controller 17 performs the following control until one sorting process is completed (hereinafter referred to as a display period).

When performing one sorting process according to one of the settings 1 to 22, the controller 17 indicates a present subtotal number of bills stacked in the first stacker 69 on the digital display 227 of the first separate display 210. Further, the controller 17 indicates a present subtotal number of bills stacked in the second stacker 70 on the digital display 227 of the second separate display 211. Furthermore, the controller 17 indicates a present subtotal number of bills stacked in the third stacker 71 on the digital display 227 of the third separate display 212.

When one of the settings 5 to 22 is selected for the sorting process, the controller 17 indicates the present subtotal number of all the bills stacked in the stackers 69 to 71 on the digital display 221 of the general display 209.

In the case of one of settings 1 to 4 and 23, it is useless to indicate on the digital display 221 of the general display 209 the subtotal number of bills in the stackers 69 to 71, which stack different denominations. Therefore, even when the number indication is selected, the controller 17 indicates the present subtotal sum of the bills stacked in all the stackers 69 to 71.

When executing one sorting process according to a setting in which the batch process is enabled, the bills which have reached the batch number may be removed from one of the stackers 69 to 71 during the sorting process. After the removal of the bills, the subtotal value of the stacker is zero, and the number of the removed bills is subtracted from the subtotal value on the general display 209. Once the bills are removed in one sorting process, the total results of the process cannot be understood only from the subtotal values. Therefore, the controller 17 memorizes the total number of the bills which are delivered to the stackers 69 to 71. When selecting the total indication by switching the total key 201, the total values of the stackers 69 to 71 are displayed on the first to third separate displays 210 to 212, respectively, and their full total value is displayed on the general display 209.

When the number indication is selected through the number/sum key 200 and total indication is selected through the total key 201, the controller 17 performs the following display control in the display period. This control is performed in the sorting process of any one of the settings 1 to 22.

The controller 17 indicates the present total number of the bills, which were delivered to the first stacker 69 in the present sorting process, on the digital display 227 of the first separate display 210. Further, the controller 17 indicates the present total number of the bills, which were delivered to the second stacker 70 in the present sorting process, on the digital display 227 of the second separate display 211. Furthermore, the controller 17 indicates the total number of the bills, which were delivered to the third stacker 71 in the present sorting process, on the digital display 227 of the third separate display 212.

When one of the settings 5 to 22 is selected for the sorting process, the controller 17 indicates the present total number of all the bills stacked in the stackers 69 to 71 on the digital display 221 of the general display 209.

In the case of one of settings 1 to 4 and 23, it is useless to indicate on the digital display 221 of the general display 209 the total number of bills in the stackers 69 to 71, which stack different denominations. Therefore, even when the number/sum key 200 is switched, the controller 17 indicates the present total sum of the bills stacked in all the stackers 69 to 71.

FIG. 16A shows examples of the indication on the digital displays 227 of the first separate display 210, the second separate display 211, and the third separate display 212 and on the digital display 221 of the general display 209, when the number indication is selected through the number/sum key 200 in the sorting process according to the setting 8. All these displays indicate the numbers of the stacked bills.

When the number indication is selected through the number/sum key 200 and total indication is selected through the total key 201, the controller 17 performs the following display control in the display period. This control is performed in the sorting process of any one of the settings 1 to 23.

The controller 17 indicates the present sum (subtotal) of the bills, which are stacked in the first stacker 69 in the present sorting process, on the digital display 227 of the first separate display 210. Further, the controller 17 indicates the present sum (subtotal) of the bills, which are stacked in the second stacker 70 in the present sorting process, on the digital display 227 of the second separate display 211. Furthermore, the controller 17 indicates the sum (subtotal) of the bills, which are stacked in the third stacker 71 in the present sorting process, on the digital display 227 of the third separate display 212. In addition, the controller 17 indicates the present sub total sum of all the bills stacked in the stackers 69 to 71 on the digital display 221 of the general display 209.

When the sum indication is selected through the number/sum key 200 and total indication is selected through the total key 201, the controller 17 performs the following display control in the display period. This control is performed in the sorting process of any one of the settings 1 to 23.

The controller 17 indicates the present sum total of the bills, which were delivered to the first stacker 69 in the present sorting process, on the digital display 227 of the first separate display 210. Further, the controller 17 indicates the present sum total of the bills, which were delivered to the second stacker 70 in the present sorting process, on the digital display 227 of the second separate display 211. Furthermore, the controller 17 indicates the present total sum of the bills, which were delivered to the third stacker 71 in the present sorting process, on the digital display 227 of the third separate display 212. In addition, the controller 17 indicates the present sub sum of the bills, which were fed into the stackers 69 to 71 in one sorting process, on the digital display 221 of the general display 209.

FIG. 16B shows examples of the indication on the digital displays 227 of the first separate display 210, the second separate display 211, and the third separate display 212 and on the digital display 221 of the general display 209, when the sum indication is selected through the number/sum key 200 in the sorting process according to the setting 8. All these displays indicate the sums of the bills.

In the display period in the sorting process combined with the batch process, when an input is received from the batch key 188, the controller 17 can indicate the present deficiencies in the batch number on the digital displays 227 of the separate displays 210 to 212 corresponding to the stackers 69 to 71 executing the batch processes.

In the mode of any one of the settings 1 to 22, whatever the displays indicate, the displays can be switched to the indication of the deficiencies in the batch number. Only the first separate display 210, the second separate display 211, and the third separate display 212 can switch their displayed contents to the indication of the deficiencies.

FIG. 16C shows examples of the indication on the digital displays 227 of the first separate display 210, the second separate display 211, and the third separate display 212 and on the digital display 221 of the general display 209, when the sorting process is executed according to the setting 1 combined with the batch process. In these examples, no input is received from the batch key 188, and the numbers of the stacked bills are displayed in a manner similar to the above examples.

FIG. 16D shows examples of the indication on the digital displays 227 of the first separate display 210, the second separate display 211, and the third separate display 212 and on the digital display 221 of the general display 209, when the sorting process is executed according to the setting 1 combined with the batch process. In these examples, an input is received from the batch key 188, and all the separate displays 210 to 212 display the deficiencies in the batch number.

In the process interrupted state, when receiving an input from the normal/damaged key 190, the controller 17 indicates the following details of the damaged notes (see FIG. 17) on the function display 208. This control is performed in the sorting process of any one of the settings 1 to 23.

The controller 17 indicates the character "UF", which means the damaged bills, and the number of damaged bills (e.g., "30") side by side on the function display 208. Further, the controller 17 indicates the character "D", which means dirtied bills, and the number of dirtied bills (e.g., "20") side by side on the function display 208. Further, the controller 17 indicates the character "T", which means worn bills, and the number of worn bills (e.g., "10") side by side on the function display 208. Further, the controller 17 indicates the character "t", which means bills on which tape are stuck, and the number of the bills with tapes (e.g., "2") side by side on the function display 208. Further, the controller 17 indicates the character "d", which means torn/crumpled bills, and the number of torn/crumpled bills (e.g., "8") side by side on the function display 208. When receiving no input from the total key 201, the controller 17 indicates the details of the damaged bills in the display period in the sorting process.

In the process interrupted state, when receiving an input from the UV key 191, the controller 17 indicates the following details of false bills on the function display 208 (see FIG. 18). This control is performed in the sorting process of any one of the settings 1 to 23.

The controller 17 indicates the character "RJ", which means the false bills, and the false bills (e.g., "3") side by side on the function display 208. Further, the controller 17 indicates the character "UV", which means the bills judged to be false based on the detection of the visible light from the bills produced by ultraviolet light, and the number of the false bills (e.g., "2") side by side on the function display 208. Further, the controller 17 indicates the character "MG", which means the bills judged to be false based on the magnetic data, and the number of the false bills (e.g., "1") side by side on the function display 208. When receiving no input from the total key 201, the controller 17 indicates the details of the false bills in the display period in the sorting process.

According to the bill arranger, when the bills loaded in the loader 11 are fed, the conveyer 12 conveys them. During their conveyance, the bills are discriminated by the discriminating device 13. Based on the results of the discrimination by the discriminating device 13, the controller 17 delivers the bills to one of the stackers 69 to 71 by the conveyer 12 according to the selected sorting process selected by the operating device 15.

Thus, the bills are stacked in the stackers 69 to 71. The stackers 69 to 71 have the shutters 118 controlled by the controller 17. When the shutters 118 are opened, the stacked bills can be removed. When the shutters 118 are closed, the bills cannot be removed. Thus, the bills stacked in the stackers 69 to 71 are prevented from being inadvertently removed by the operator.

There are two conditions one in which the removal of the bills from the stackers 69 to 71 is allowed, and another in which the removal of the bills from the stackers 69 to 71 is not allowed. Only when the removal of the bills from the stackers 69 to 71 is allowed, can the controller 17 open the shutters 118. The bills stacked in the stackers 69 to 71 are prevented from being inadvertently removed by the operator.

Further, when the shutters 118 are closed, the shutters 118 are fixed so that they cannot be opened. When the shutters are closed, the operator cannot manually open the shutters 118. The bills stacked in the stackers 69 to 71 are prevented from being inadvertently removed by the operator.

The stackers 69 to 71 have the pushers 154 for changing the positions of the stacked bills. The pushers 154 changes the positions of the stacked bills by control of the controller 17 when the shutters 118 are opened. The stacked bills, which were hard to remove, become easy to remove. This improves the working efficiency when the operator removes the bills from the stackers 69 to 71.

As the shutters 118 are opened, the pushers 154 simultaneously change the positions of the bills. The same driving source is used to drive the shutters 118 and to drive the pushers 154 for changing the positions of the bills. The driving source is the shutter drive motor 131. Thus, the costs are reduced.

Further, the stackers 69 to 71 have the guide mechanisms 144 movable by the weight of the stacked bills delivered to the stackers 69 to 71 by the conveyer 12. The guide mechanisms 144 reduce the stacking spaces 109 in the stackers 69 to 71 when there is a small amount of bills, and move as the number of bills increases so that the stacking spaces 109 are increased. Therefore, the guide mechanisms 144 narrow the moving range of the bills within the stackers 69 to 71 at the beginning of the process. The bills, which were delivered to the stackers 69 to 71 at the beginning of the process, are stably stacked, and do not interfere with the following bills delivered into the stackers 69 to 71 by the conveyer 12 so that the bills are regularly stacked. Even when the capacities of the stackers 69 to 71 are increased, the bills, delivered into the stackers 69 to 71 by the conveyer 12, can be securely stacked.

Further, the guide mechanisms 144 move by the weight of the bills delivered into the stackers 69 to 71 by the conveyer 12. The movement of the guide mechanisms 144 is not based on the thickness of the stacked bills. Therefore, the delivered bills can be freely delivered into the stackers 69 to 71 by the conveyer 12.

In the guide mechanism 144, the guide plates 145 reduce the capacities of the stacking spaces 109 in the stackers 69 to 71 by the urging force of the springs 148 when the stacked bills S are light, and move as the weight of bills increases so that the capacities of the stacking spaces 109 are increased. With this simple construction, the moving range of the bills within the stackers 69 to 71 is narrowed at the beginning of the process. Thus, the guide mechanisms 144 can be simplified.

Further, the guide mechanisms 144 are rotatably attached to the stackers 69 to 71. The guide mechanisms 144 reduce the capacities of the stacking spaces 109 in the stackers 69 to 71 when there is a small amount of stacked bills, and are rotated as the number of bills increases so that the capacities of the stacking spaces 109 are increased. The construction for narrowing the moving range of the bills within the stackers 69 to 71 at the beginning of the process can be further simplified.

The guide mechanisms 144 are rotatably attached to the output openings 110 of the stackers 69 to 71, and do not narrow the output openings 110. Thus, the operator can easily remove the bills through the output openings 110 from the stackers 69 to 71.

The guide mechanism 144 may be made from deformable elastic resin which can be deformed by the weight of the bills delivered into the stackers 69 to 71 by the conveyer 12. This elastic deformable resin guide mechanisms 144 reduce the capacities of the stacking spaces 109 in the stackers 69 to 71 when there is a small amount of bills, and are deformed as the number of bills increases so that the capacities of the stacking spaces 109 are increased. With this simple construction, the moving range of the bills within the stackers 69 to 71 is narrowed at the beginning of the process.

When one of the sorting process modes is selected through the operating device 11, the separate displays 210 to 212 display the respective details of the sorting of the stackers 69 to 71 according to the sorting process mode selected through the operating device 11.

The respective separate displays 210 to 212 display how the bills are sorted into the stackers 69 to 71. Even when various sorting processes are selectable, the operator can easily confirm the details of the sorting of the bills stacked in the stackers 69 to 71.

Because the separate displays 210 to 212 display at least one of the number and the sum of the bills stacked in the stackers 69 to 71, the operator can easily recognize the respective amounts of the bills stacked in the stackers 69 to 71.

Further, the general display 209 is provided in common to the stackers 69 to 71. The general display 209 displays the total number or the total sum of the bills in all the stackers 69 to 71 which is the information common to all the stackers 69 to 71. Thus, the operator can recognize the information common to all the stackers 69 to 71.

When the general display 209 displays the number or sum of the bills stacked in the stackers 69 to 71, the controller 17 indicates whether the number display or the sum display is selected, by turning on the number lamp 219 or the sum lamp 220. The operator can recognize whether the number or the sum of the bills is displayed.

The characters printed on the keys of the operating device are not limited to those in the embodiment. For instance, the characters on the 100 key 192, the 50 key 193, and the 10 key 194 may be substituted for other characters. Further, the characters "100", "50", and "10", which represents the denominations, on the first separate display 210, the second separate display 211, the third separate display 212, the general display 209, and the function display 208 may be substituted for other characters.

While the embodiment of the bill arranger is used in Japan, the invention may be used in the other countries, and the contents displayed on the displays may be modified according to the language and the denominations of the countries.

The respective stackers have the separate displays. The respective separate displays display how the bills are sorted into the stackers. Even when various sorting processes are selectable, the operator can easily confirm the details of the sorting of the bills stacked in the stackers.

When one of the sorting process modes is selected with said operating device, the controller indicates the respective details of sorting of the stackers according to the selected sorting process mode on said corresponding displays.

The respective separate displays display how the bills are sorted into the stackers. Even when various sorting processes are performed, the operator can easily confirm the details of the sorting of the bills stacked in the stackers according to the selected sorting process mode.

The displays indicate at least one of the number and sum of the bills stacked in the stackers. Because each display displays at least one of the number and the sum of the bills stacked in the stacker, the operator can easily recognize the respective amounts of the bills stacked in the stackers.

Further, the general display is provided in common for all the stackers, and can change the displayed contents.

The general display displays the total number or the total sum of the bills in all the stackers which is the information common to all the stackers. Thus, the operator can recognize the information common to all the stackers.

The general display indicates at least one of the total number and the total sum of all the bills stacked in the stackers. Thus, the operator can recognize the information common to all the stackers.

The general display indicates one of the total number and the total sum of all the bills stacked in said stackers, and indicates whether the total number or the total sum is selected. The operator can recognize whether the number or the sum of the bills is displayed.

This invention may be embodied in other forms or carried out in other ways without departing from the spirit thereof. The present embodiments are therefore to be considered in all respects illustrative and not limiting, the scope of the invention being indicated by the appended claims, and all modifications falling within the meaning and range of equivalency are intended to be embraced therein.

What is claimed is:

1. A bill arranger comprising:

a loader for loading bills and feeding the bills one by one;

a conveyer for conveying the bills fed from said loader;

a discriminating device for discriminating the bills conveyed by said conveyer;

a plurality of stackers for stacking the bills conveyed thereto by said conveyer, so that the bills can be removed;

an operating device for selecting one of a plurality of sorting process modes to define a method of sorting the bills loaded in said loader;

a controller for delivering each bill via said conveyor to one of said stackers based on the results of the discrimination thereof by said discriminating device and, according to the selected sorting process mode; and a plurality of separate displays, each provided in a vicinity of a respective one of said stackers, to display the contents of said respective stacker, wherein, when one of said plurality of sorting process modes is selected with said operating device, said separate displays are adapted to indicate the respective details of sorting of said stackers according to the selected sorting process mode, and further comprising a general display in common for all said stackers, said general display indicating at least one of the total number and the total sum of all the bills stacked in said stackers, and indicating which one of the total number and the total sum is indicated.

2. A bill arranger according to claim 1, wherein said separate displays indicate at least one of the number and sum of the bills stacked in said respective stackers.

3. A bill arranger according to claim 1, wherein said separate displays are located in the vicinity of output openings of the respective stackers.

4. A bill arranger for sorting and stacking bills, comprising:

a loader for receiving a stack of bills to be sorted and for feeding bills one by one from said stack;

a conveyer assembly for conveying bills fed from said loader;

a discriminating device for discriminating bills conveyed by said conveyer;

a plurality of stackers for receiving and stacking bills conveyed thereto by said conveyor;

an operating device for selecting one of a plurality of sorting process modes to define a method of sorting the bills loaded in said loader;

a controller for delivering bills to said stackers via said conveyer based upon a result of the discrimination thereof by said discriminating device and according to the selected sorting process mode; and a plurality of separate display units, a said display unit being disposed adjacent each said stacker to display a content of said respective stacker, wherein when one of said plurality of sorting process modes is selected with said operating device, said display units are adapted to indicate the respective details of sorting of said stackers according to the selected sorting process mode, and further comprising a general display in common for all said stackers, said general display indicating at least one of the total number and the total sum of all the bills stacked in said stackers, and indicating which one of the total number and the total sum is indicated.

5. A bill arranger according to claim 4, wherein said discriminating device includes a first discriminating unit for at least one of detecting image data of bills conveyed by the conveyor and detecting magnetic data from materials contained in ink on the bills conveyed by the conveyor and outputs results of detection to the controller.

6. A bill arranger according to claim 5, wherein the discriminating device further comprises a second discriminating unit for emitting ultraviolet light on bills conveyed by the conveyor and for detecting light reflected from the bill, and outputs the results of detection to the controller.

7. A bill arranger according to claim 4, wherein each said display unit displays data related to said respective stacker, said data comprising at least one of a number and a sum of bills stacked in said respective stacker.

8. A bill arranger according to claim 4, wherein each said display unit is provided adjacent an output opening of said respective stacker.

* * * * *